United States Patent
Jin et al.

(10) Patent No.: US 11,469,674 B2
(45) Date of Patent: Oct. 11, 2022

(54) RESONANT DC-DC CONVERTER

(71) Applicant: Delta Electronics, Inc., Taoyuan (TW)

(72) Inventors: Da Jin, Taoyuan (TW); Yahong Xiong, Taoyuan (TW); Yingjun Li, Taoyuan (TW); Qinghua Su, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 16 days.

(21) Appl. No.: 17/014,446

(22) Filed: Sep. 8, 2020

(65) Prior Publication Data

US 2021/0075323 A1 Mar. 11, 2021

(30) Foreign Application Priority Data

Sep. 11, 2019 (CN) .......................... 201910860676.0

(51) Int. Cl.
*H02M 3/158* (2006.01)
*H02M 3/00* (2006.01)

(52) U.S. Cl.
CPC ........... *H02M 3/1584* (2013.01); *H02M 3/01* (2021.05); *H02M 3/1586* (2021.05)

(58) Field of Classification Search
CPC .... H02M 3/01; H02M 3/1584; H02M 3/1586; H02M 1/0058; H02M 1/14; H02M 1/007; H02M 3/07; H02M 1/0095
See application file for complete search history.

(56) References Cited

U.S. PATENT DOCUMENTS

| | | | |
|---|---|---|---|
| 5,932,995 A | * | 8/1999 | Wagoner ............... H02M 3/158 323/222 |
| 6,437,999 B1 | | 8/2002 | Wittenbreder |

(Continued)

FOREIGN PATENT DOCUMENTS

| | | |
|---|---|---|
| CN | 204633600 U | 9/2015 |
| CN | 103081325 B | 8/2016 |

(Continued)

OTHER PUBLICATIONS

Huang, Daocheng et al., Novel Non-isolated LLC Resonant Converters, IEEE, 2012, pp. 1373-1380.

(Continued)

*Primary Examiner* — Alex Torres-Rivera
(74) *Attorney, Agent, or Firm* — Kirton McConkie; Evan R. Witt

(57) ABSTRACT

A power conversion system is provided. The power conversion system includes N power conversion circuits. Each power conversion circuit includes an input, an output, two switching power conversion units and at least one resonant capacitor. The input and output are configured to receive an input voltage and output an output voltage respectively. Each switching power conversion unit includes a plurality of switches and a winding. The plurality of switches operates periodically according to a switching period. A dotted terminal of one winding is electrically coupled to an undotted terminal of the other winding. The two windings are magnetically coupled to each other to form a transformer. In one switching period, the resonant capacitor stores an energy or outputs the stored energy as the corresponding switch is turned on or off. A resonance is generated between the resonant capacitor and inductor with a resonant frequency and a resonant period.

22 Claims, 19 Drawing Sheets

(56) References Cited

U.S. PATENT DOCUMENTS

| | | | | |
|---|---|---|---|---|
| 6,486,642 | B1* | 11/2002 | Qian | H02M 3/158 |
| | | | | 323/255 |
| 6,897,641 | B1* | 5/2005 | Herbert | H02M 3/1584 |
| | | | | 323/282 |
| 7,233,132 | B1* | 6/2007 | Dong | H02M 3/1584 |
| | | | | 323/272 |
| 9,379,619 | B2* | 6/2016 | Barnette | H02M 3/1584 |
| 2005/0174097 | A1* | 8/2005 | Kimura | H02M 3/1584 |
| | | | | 323/282 |
| 2006/0087295 | A1 | 4/2006 | Jang et al. | |
| 2009/0278520 | A1 | 11/2009 | Perreault et al. | |
| 2013/0121033 | A1* | 5/2013 | Lehn | H02M 3/33569 |
| | | | | 363/16 |
| 2014/0346962 | A1 | 11/2014 | California | |
| 2015/0002115 | A1 | 1/2015 | Shenoy et al. | |
| 2017/0366087 | A1 | 12/2017 | Wei et al. | |
| 2019/0229623 | A1* | 7/2019 | Tsuda | H02M 3/073 |

FOREIGN PATENT DOCUMENTS

| | | |
|---|---|---|
| CN | 106026652 A | 10/2016 |
| CN | 206211844 U | 5/2017 |
| CN | 106936320 A | 7/2017 |
| CN | 108022731 A | 5/2018 |
| CN | 109428490 A | 3/2019 |
| CN | 208820683 U | 5/2019 |
| EP | 3072229 A1 | 9/2016 |

OTHER PUBLICATIONS

Yungtaek Jang et al., Multiphase buck converters with extended duty cycle, IEEE Conference Publication, 2006, pp. 38-44.

Li Na et al., Research on the Output Essential Safety for Interleaving Magnetics Buck Converter, Journal of Power Supply, Jul. 2012.

* cited by examiner

RESONANT DC-DC CONVERTER

CROSS-REFERENCE TO RELATED APPLICATION

This application claims priority to China Patent Application No. 201910860676.0, filed on Sep. 11, 2019. The entire contents of the above-mentioned patent applications are incorporated herein by reference for all purposes.

FIELD OF THE INVENTION

The present disclosure relates to a power conversion system, and more particularly to a power conversion system capable of turning off the switches at zero current and turning on the switches at zero voltage.

BACKGROUND OF THE INVENTION

In conventional applications of non-isolated step-down DC-DC converters with high output current, a two-phase buck circuit with parallel configuration is employed. Please refer to FIG. 1 and FIG. 2. FIG. 1 is a schematic circuit diagram illustrating a symmetric two-phase buck circuit with extended duty ratio. FIG. 2 is a schematic circuit diagram illustrating an asymmetric two-phase buck circuit with extended duty ratio. These two buck circuits both utilize capacitors to double the duty ratio, thereby reducing the voltage stress on switches and the effective value of switching current greatly. Consequently, the voltage seconds on inductors are reduced, and the size of inductors is greatly decreased. In addition, the switches in every phase of the buck circuit are driven by two signals having 180 degrees out of phase with respect to each other. Therefore, the frequency of the output voltage ripple is doubled, and the output voltage ripple is greatly reduced.

However, the two conventional circuits shown in FIG. 1 and FIG. 2 are both hard switching circuits, which cause the high switching loss and low switching frequency of the DC-DC converter. Moreover, the power conversion density of the DC-DC converter cannot be further improved.

Therefore, there is a need of providing a power conversion system to obviate the drawbacks encountered from the prior arts.

SUMMARY OF THE INVENTION

It is an objective of the present disclosure to provide a power conversion system. A resonance is generated among the resonant capacitors and inductors through controlling switches on and off. Accordingly, the switches can be turned off at zero current and can be turned on at zero voltage. Consequently, the switching loss is greatly reduced, and the energy conversion efficiency is improved.

It is another objective of the present disclosure to provide a power conversion system. With regard to high-power applications, a plurality of power conversion circuits connected in parallel and interleaved with each other is utilized to enlarge the load capacity of the power conversion system. Through the phase shifts among the control signals, the plurality of power conversion circuits are allowed to be connected in parallel and to be interleaved with each other. Meanwhile, the current ripples at the input and output sides of the power conversion system are reduced. Consequently, the filtering components with small size can be employed, and the size of the power conversion system is decreased.

In accordance with an aspect of the present disclosure, there is provided a power conversion system. The power conversion system includes N power conversion circuits, wherein N is an integer larger than or equal to 1. Each of the N power conversion circuits includes an input, an output, two switching power conversion units and at least one resonant capacitor. The input is configured to receive an input voltage. The output is configured to output an output voltage. The two switching power conversion units are cascaded coupled between the input and the output. Each of the two switching power conversion units includes a plurality of switches and a winding. A part of the plurality of switches is connected in series with each other and is coupled among the inputs of the N power conversion circuits. The plurality of switches operates periodically according to a switching period. The two windings of the two switching power conversion units have the same turn. A dotted terminal of one winding is electrically coupled to an undotted terminal of the other winding, and the dotted and undotted terminals of the two windings are coupled to the output. The two windings are magnetically coupled to each other to form a transformer. The at least one resonant capacitor is serially coupled between the input and the output. The resonant capacitor has a DC voltage proportional to the input voltage. In one switching period, the resonant capacitor stores an energy or outputs the stored energy to the output as the corresponding switch of the switching power conversion unit is turned on or off. A resonance is generated between the resonant capacitor and a resonant inductor, and the generated resonance has a resonant frequency and a resonant period.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
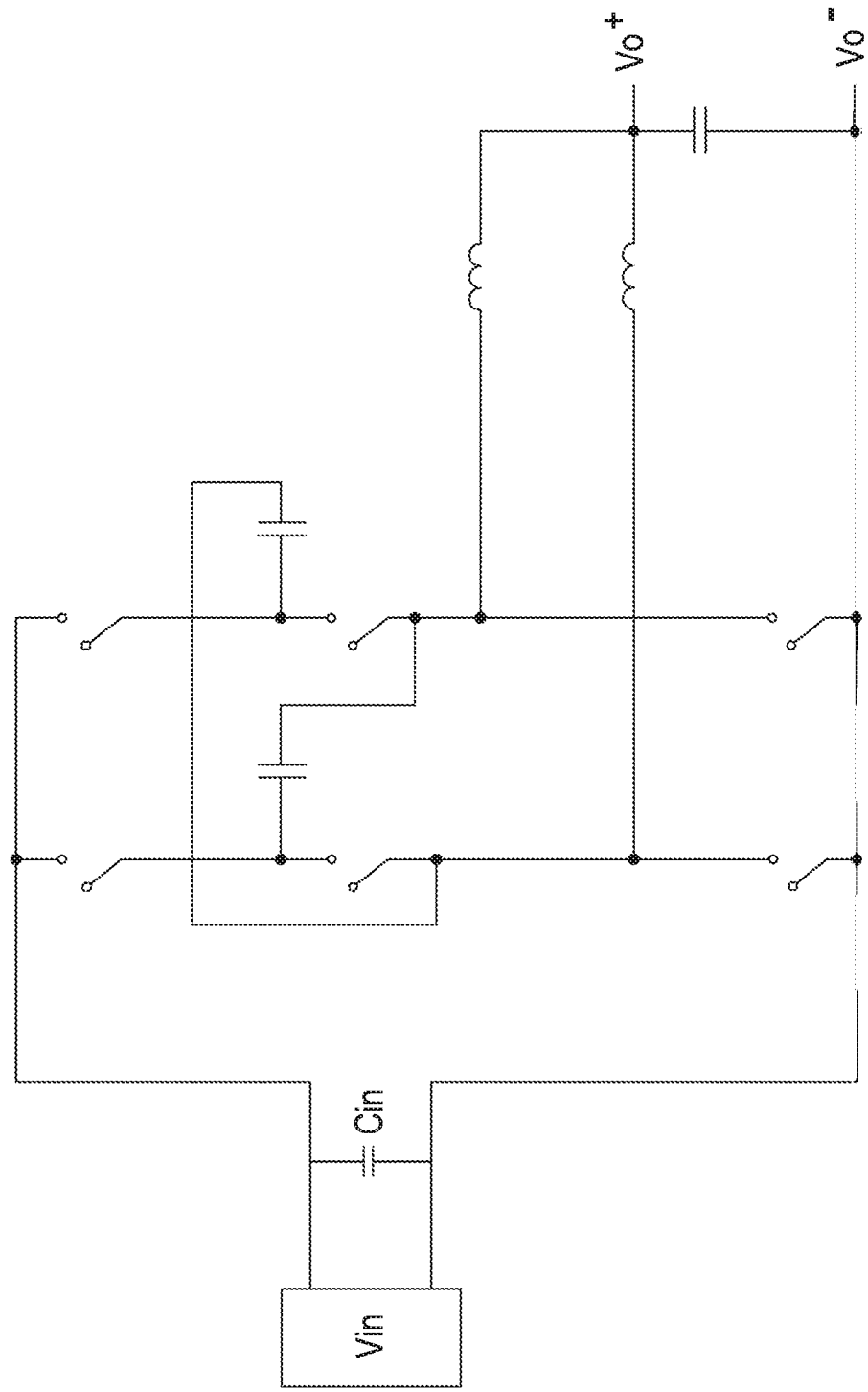
FIG. 1 and FIG. 2 are schematic circuit diagrams illustrating conventional two-phase buck circuits with extended duty ratio.
Figure 2:
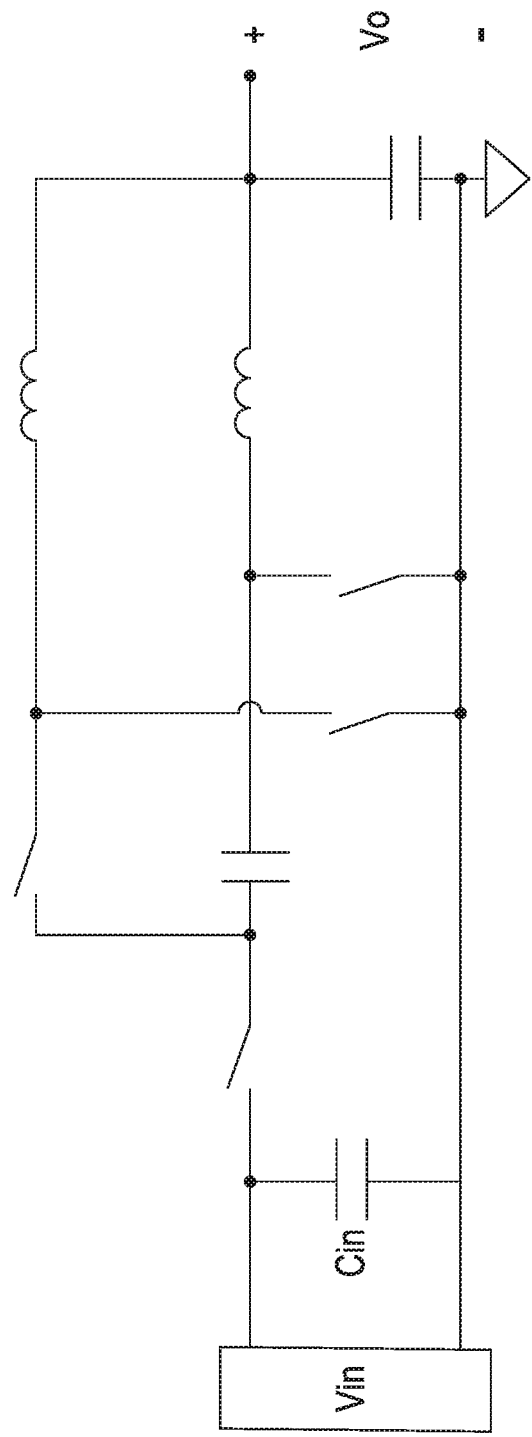
Figure 3:
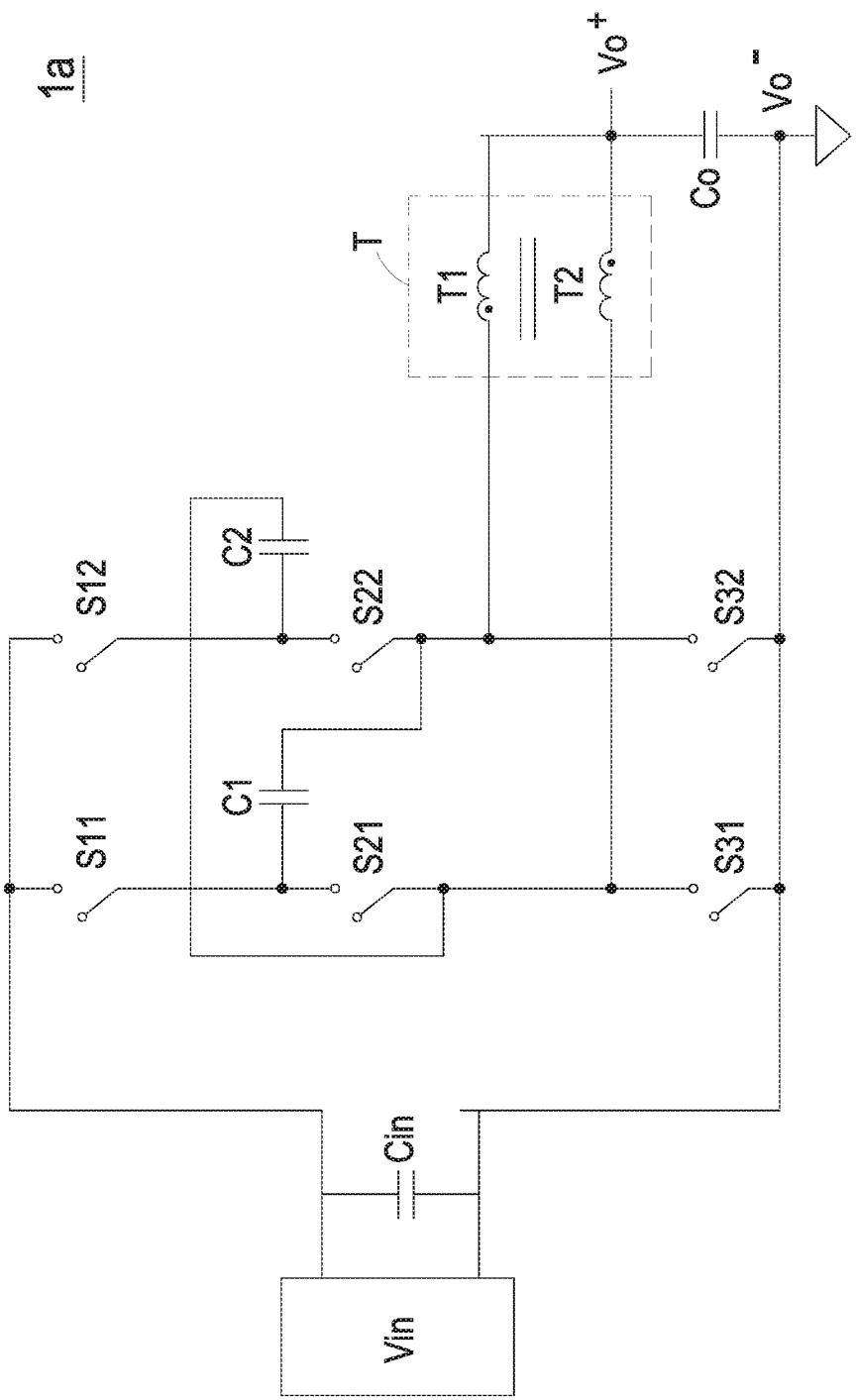
FIG. 3 is a schematic circuit diagram illustrating a power conversion circuit according to a first embodiment of the present disclosure.

FIG. 3 is a schematic circuit diagram illustrating a power conversion circuit according to a first embodiment of the present disclosure. As shown in FIG. 3, in the first embodiment of the present disclosure, the power conversion system includes one power conversion circuit 1a, and the power conversion circuit 1a has a symmetric circuit configuration. The power conversion circuit 1a includes an input, an output, two cascaded switching power conversion units and two resonant capacitors C1 and C2. The input is configured to receive an input voltage Vin, the output is configured to output an output voltage $V_O$, and the ratio of the input voltage Vin to the output voltage $V_O$ is 4:1. The two cascaded switching power conversion units are coupled between the input and the output. In this embodiment, one of the two switching power conversion units includes a first switch S11, a second switch S22, a third switch S32 and a winding T1. The first switch S11, the second switch S22 and the third switch S32 operate periodically according to a switching period and have a switching frequency. One terminal of the winding T1 is electrically connected between the second switch S22 and the third switch S32, and the other terminal of the winding T1 is electrically connected to a positive electrode of the output. The other switching power conversion unit includes a first switch S12, a second switch S21, a third switch S31 and a winding T2. The first switch S12, the second switch S21 and the third switch S31 operate periodically according to a switching period and have a switching frequency. One terminal of the winding T2 is electrically connected between the second switch S21 and the third switch S31, and the other terminal of the winding T2 is electrically connected to the positive electrode of the output. One terminal of the resonant capacitor C1 is electrically connected between the first switch S11 and the second switch S21, and the other terminal of the resonant capacitor C1 is electrically connected between the second switch S22 and the third switch S32. One terminal of the resonant capacitor C2 is electrically connected between the first switch S12 and the second switch S22, and the other terminal of the resonant capacitor C2 is electrically connected between the second switch S21 and the third switch S31.

The first switch S11, the second switch S22 and the third switch S31 are controlled on and off by the same control signal. The first switch S12, the second switch S21 and the third switch S32 are controlled on and off by the same control signal. These two control signals are 180 degrees out of phase with respect to each other.

The turns of the windings T1 and T2 are the same. The dotted terminal of the winding T1 and the undotted terminal of winding T2 are connected together to form the positive electrode of the output of the power conversion circuit 1a, or the undotted terminal of the winding T1 and the dotted terminal of winding T2 are connected together to form the positive electrode of the output of the power conversion circuit 1a. The windings T1 and T2 are wound around the same magnetic core pillar to form a close-coupling transformer T. There is an air gap on the magnetic core of the transformer T. The resonance is generated among the resonant capacitors C1 and C2 and the resonant inductor through controlling the plurality of switches on and off. Accordingly, the switches can be turned off at zero current and can be turned on at zero voltage. The resonant inductor is for example but not limited to a leakage inductance of the transformer T or a parasitic inductance of wires. Further, for turning the switches on at zero voltage, the inductance value of the windings T1 and T2 may be controlled to make the magnetizing inductance of windings small enough and make the magnetizing current large enough.

Figure 4:
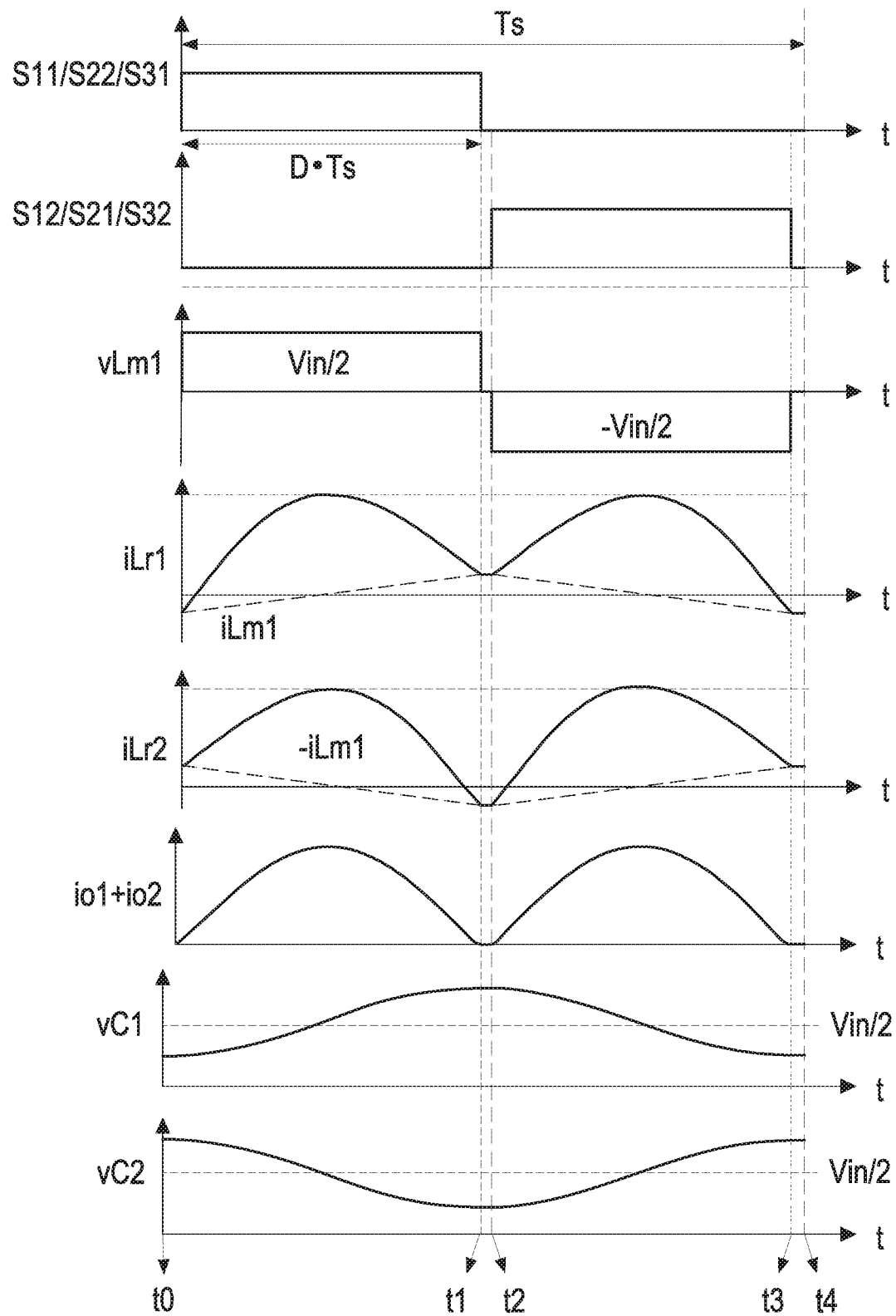
FIG. 4 is a schematic oscillogram showing the waveforms of currents in FIG. 3 corresponding to the variation of the switch state, wherein the resonant period is equal to the switching period.
Figure 5A:
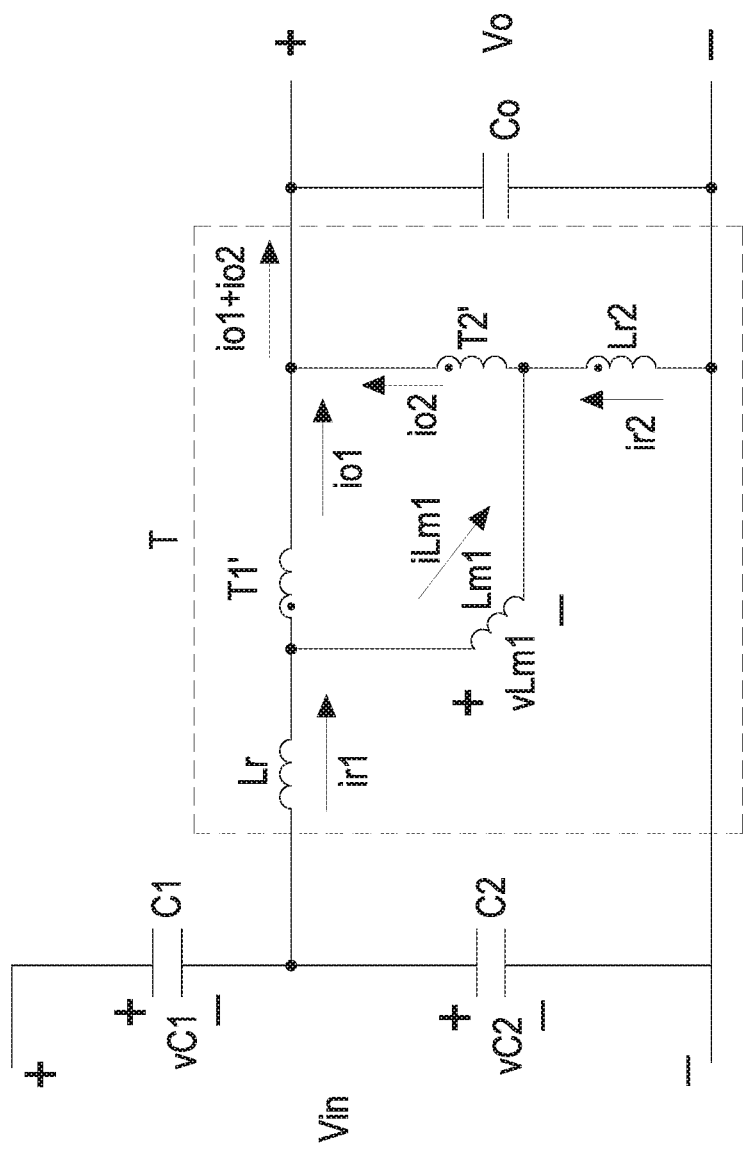
FIG. 5A and FIG. 5B are schematic simplified circuit diagrams of the power conversion circuit of FIG. 3 during different periods of time in the switching period.
Figure 5B:
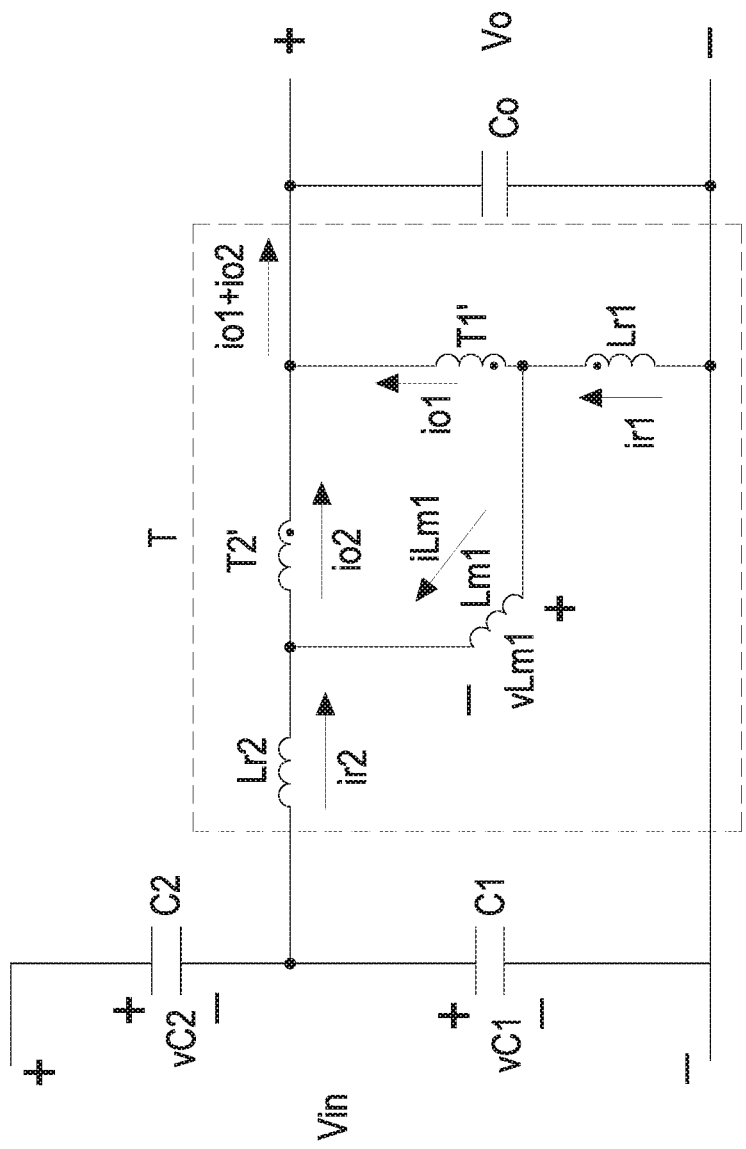

FIG. 4 is a schematic oscillogram showing the waveforms of currents in FIG. 3 corresponding to the variation of the switch state. FIG. 5A and FIG. 5B are schematic simplified circuit diagrams of the power conversion circuit of FIG. 3 during different periods of time in the switching period. In particular, FIG. 5A is a schematic equivalent circuit diagram of the power conversion circuit while the switches S11, S22 and S31 being on, and FIG. 5B is a schematic equivalent circuit diagram of the power conversion circuit while the switches S12, S21 and S32 being on. Regarding the equivalent circuits of the transformer T shown in FIG. 5A and FIG. 5B, since the dotted terminal of the winding T1 and the undotted terminal of the winding T2 are electrically connected, the windings T1 and T2 can be equivalent to two ideal windings T1' and T2' connected in series. The equivalent magnetizing inductance Lm1 is connected to the two ends of the serial ideal windings T1' and T2' in parallel. The equivalent leakage inductance is divided into the resonant inductors Lr1 and Lr2, and the resonant inductors Lr1 and Lr2 are serially connected to two ends of the parallel branch, which includes the equivalent magnetizing inductance Lm1 and the serial ideal windings T1' and T2', respectively. As shown in FIGS. 4, 5A and 5B, D represents the duty ratio, Ts represents the switching period, iLr1 represents the resonant current flowing through the resonant inductor Lr1, and iLr2 represents the resonant current flowing through the resonant inductor Lr2. The resonant current iLr1 includes a load current io1 and a magnetizing current iLm1. The resonant current iLr2 includes a load current io2 and the magnetizing current iLm1. The magnetizing current iLm1 is determined by the voltage and magnetizing inductance Lm1 applied on the two ends of the windings T1 and T2. The resonant current iLr1 is generated from the resonance between the resonant capacitor Cb and the resonant inductor Lr1, and the resonant current iLr2 is generated from the resonance between the resonant capacitor Cb and the resonant inductor Lr2.

$$Cb = C1 + C2 \quad (1),$$

$$Lr1 = Lk1 + Leq1 \quad (2),$$

$$Lr2 = Lk2 + Leq2 \quad (3),$$

where Lk1 and Lk2 are the leakage inductance of the transformer T, and Leq1 and Leq2 are the parasitic inductance of wires or/and the additional serial inductor. Since the dotted terminal of the winding T1 and the undotted terminal of the winding T2 are electrically connected, the turns of winding T1 and T2 are same, and the load currents flowing through the ideal winding T1' and T2' are equal, i.e., io1=io2.

During a period from the time t0 to the time t1, the first switch S11, the second switch S22 and the third switch S31 are in the "on" state, and the first switch S12, the second switch S21 and the third switch S32 are in the "off" state. The equivalent circuit of the power conversion circuit 1a in this period is shown in FIG. 5A. The resonant capacitor C1 is charged by the input voltage Vin, and the resonant capacitor C2 is discharged to the output. The voltage vLm1 on the two ends of the equivalent magnetizing inductance Lm1 is equal to Vin/2. The magnetizing current iLm1 is determined by the voltage vLm1 and the equivalent magnetizing inductance Lm1. A resonance is generated among the resonant inductors Lr1 and Lr2 and the resonant capacitor Cb, and the resonant currents iLr1 and iLr2 are generated accordingly. In this embodiment, when the resonant currents iLr1 and iLr2 equal the magnetizing currents iLm1 and −iLm1 respectively, i.e., when the load currents io1 and io2 both equal zero, the first switch S11, the second switch S22 and the third switch S31 are turned off for realizing the zero current switching (ZCS) of switches. Consequently, the turning-off loss of switches is reduced, and the energy conversion efficiency of the power conversion circuit 1a is improved. In addition, in this period, the terminal voltage of the first switch S12 equals Vin/2, the terminal voltage of the second switch S21 equals Vin, and the terminal voltage of the third switch S32 equals Vin/2. The voltage on the two ends of the resonant capacitors C1 and C2 equals a DC voltage superposed by an AC resonant voltage, and the typical value of the DC voltage equals Vin/2. Taking the parameter distribution of components into consideration, the ratio value of the DC voltage to the input voltage is between 0.4 and 0.6. The amplitude of the AC resonant voltage is determined by the resonant inductance value, the resonant capacitance value, the switching frequency and the magnitude of load.

During a period from the time t1 to the time t2, all the switches are turned off. The magnetizing current iLm1 flowing through the windings T1 and T2 flows continuously for extracting the charges on the parasitic capacitors of the first switch S12, the second switch S21 and the third switch S32, thereby reducing the terminal voltages of the first switch S12, the second switch S21 and the third switch S32. When the terminal voltage of the first switch S12, the second switch S21 or the third switch S32 is reduced to be smaller than 50% of the corresponding initial voltage (i.e., the terminal voltage of the switch at the time t1), the first switch S12, the second switch S21 and the third switch S32 are turned on. Consequently, the turning-on loss of switches is reduced, and the energy conversion efficiency and power density of the power conversion circuit 1a are improved. In another embodiment, the inductance values of the windings T1 and T2 may be controlled to make the equivalent magnetizing inductance Lm1 of the windings T1 and T2 small enough and make the magnetizing current iLm1 flowing through the magnetizing inductance Lm1 large enough. Accordingly, the charges on the parasitic capacitors of the first switch S12, the second switch S21 and the third switch S32 can be extracted exhaustively, and the terminal voltages of the first switch S12, the second switch S21 and the third switch S32 are decreased to zero. Therefore, when the body diodes of the first switch S12, the second switch S21 and the third switch S32 are on, the first switch S12, the second switch S21 and the third switch S32 are turned on, thus the zero voltage switching (ZVS) of switches are realized. The turning-on loss of switches can be further reduced, and the energy conversion efficiency and power density of the power conversion circuit 1a are improved.

During a period from the time t2 to the time t3, the first switch S12, the second switch S21 and the third switch S32 are in "on" state and the first switch S11, the second switch S22 and the third switch S31 are in "off" state. The equivalent circuit of the power conversion circuit 1a in this period is shown in FIG. 5B. The resonant capacitor C2 is charged by the input voltage Vin, and the resonant capacitor C1 is discharged to the output. The voltage vLm1 on the two ends of the equivalent magnetizing inductance Lm1 is equal to −Vin/2. The magnetizing current iLm1 is determined by the voltage vLm1 and the equivalent magnetizing inductance Lm1. A resonance is generated among the resonant inductors Lr1 and Lr2 and the resonant capacitor Cb, and the resonant currents iLr1 and iLr2 are generated accordingly. In this embodiment, when the resonant currents iLr1 and iLr2 equal the magnetizing currents −iLm1 and iLm1, i.e., when the load currents io1 and io2 both equal zero, the first switch S12, the second switch S21 and the third switch S32 are turned off for realizing the zero current switching (ZCS) of switches. Consequently, the turning-off loss of switches is reduced, and the energy conversion efficiency of the power conversion circuit 1a is improved. In addition, in this period, the terminal voltage of the first switch S 11 equals Vin/2, the terminal voltage of the second switch S22 equals Vin, and the terminal voltage of the third switch S31 equals Vin/2. The voltage on the two ends of the resonant capacitors C1 and C2 equals a DC voltage superposed by an AC resonant voltage, and the typical value of the DC voltage equals Vin/2. Taking the parameter distribution of components into consideration, the ratio value of the DC voltage to the input voltage is between 0.4 and 0.6. The amplitude of the AC resonant voltage is determined by the resonant inductance value, the resonant capacitance value, the switching frequency and the magnitude of load.

During a period from the time t3 to the time t4, all the switches are turned off. The magnetizing current iLm1 flowing through the windings T1 and T2 flows continuously for extracting the charges on the parasitic capacitors of the first switch S11, the second switch S22 and the third switch S31, thereby reducing the terminal voltages of the first switch S11, the second switch S22 and the third switch S31. In an embodiment, when the terminal voltage of the first switch S11, the second switch S22 or the third switch S31 is reduced to be smaller than 50% of the corresponding initial voltage (i.e., the terminal voltage of the switch at the time t3), the first switch S11, the second switch S22 and the third switch S31 are turned on, and the next switching period begins. Consequently, the turning-on loss of switches is reduced, and the energy conversion efficiency and power density of the power conversion circuit 1a are improved. In another embodiment, the inductance values of the windings T1 and T2 may be controlled to make the equivalent magnetizing inductance Lm1 of the windings T1 and T2 small enough and make the magnetizing current iLm1 flowing through the magnetizing inductance Lm1 large enough. Accordingly, the charges on the parasitic capacitors of the first switch S11, the second switch S22 and the third switch S31 can be extracted exhaustively, and the terminal voltages of the first switch S11, the second switch S22 and the third switch S31 are decreased to zero. Therefore, when the body diodes of the first switch S11, the second switch S22 and the third switch S31 are on, the first switch S11, the second switch S22 and the third switch S31 are turned on, thus the zero voltage switching (ZVS) of switches are realized. The turning-on loss of the switches can be further reduced, and the energy conversion efficiency and power density of the power conversion circuit 1a are improved.

In above embodiments, during the period from the time t0 to the time t1 and the period from the time t2 to the time t3, the resonant currents iLr1 and iLr2 flows through the resonant inductors Lr1 and Lr2 simultaneously, and the frequency of the resonant currents iLr1 and iLr2 is equal to the resonant frequency. During the period from the time t1 to the time t2 and the period from the time t3 to the time t4, all the switches are turned off. The magnetizing current iLm1 flowing through the windings T1 and T2 charges and discharges the parasitic capacitors of the switches, and the frequency of the magnetizing current iLm1 is equal to the switching frequency. In this embodiment, the loss of turning off the switches are reduced through the zero current switching, and a resonant period of the resonance among the resonant capacitors C1 and C2 and the resonant inductors Lr1 and Lr2 is substantially equal to the switching period.

In another embodiment, the capacitance value of the resonant capacitors C1 and C2 is large, and the inductance value of the resonant inductors Lr1 and Lr2 is small. Therefore, when the resonant currents iLr1 and iLr2 are larger than the magnetizing currents iLm1 and −Lm1 respectively, i.e., when the load currents io1 and io2 are larger than zero, the corresponding switches can be turned off. Although the turning-off current is larger than zero, the loss caused by the non-zero current switching can be ignored actually due to the small inductance values of the resonant inductors Lr1 and Lr2. However, for taking the loss and the energy conversion efficiency into consideration, the switching period Ts is preferable to be larger than or equal to 0.5 times of resonant period Tr. The equation for calculating the turning-off loss is shown as follows.

$$P_{Lr} = 2f_{sw} \cdot \frac{Lr}{2} \cdot (I_{Lr}^2 - I_{Lm}^2), \quad (4)$$

where $P_{Lr}$ is the turning-off loss, $I_{Lr}$ is the resonant current iLr1 or iLr2 while turning off, $I_{Lm}$ is the magnetizing current while turning off, and fsw is the switching frequency of the switches of the power conversion circuit 1a.

Figure 6:
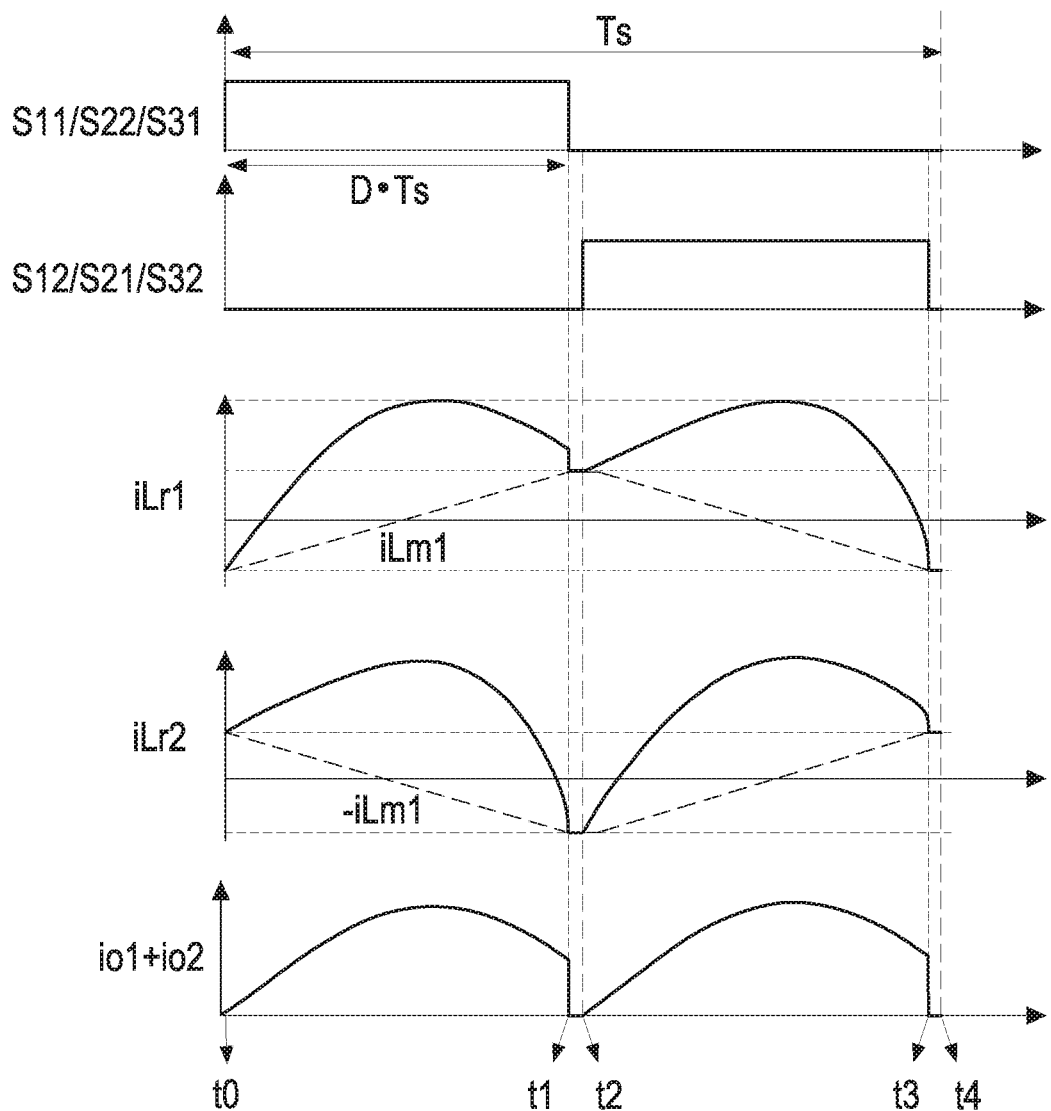
FIG. 6 is a schematic oscillogram showing the waveforms of currents in FIG. 3 corresponding to the variation of the switch state, wherein the resonant period is larger than the switching period.

Since the inductance value of the resonant inductors Lr1 and Lr2 is small, the turning-off loss $P_{Lr}$ is small, which would not affect the conversion efficiency of the power conversion circuit 1a. The corresponding oscillogram is shown in FIG. 6. At the time t1, the resonant current iLr1 is larger than the magnetizing current iLm1, the resonant current iLr2 is larger than the magnetizing current −iLm1, and the first switch S11, the second switch S22 and the third switch S31 are turned off at this moment. At the time t3, the resonant current iLr1 is larger than the magnetizing current −iLm1, the resonant current iLr2 is larger than the magnetizing current iLm1, and the first switch S12, the second switch S21 and the third switch S32 are turned off at this moment. In this embodiment, the switching period is smaller than the resonant period.

Figure 7:
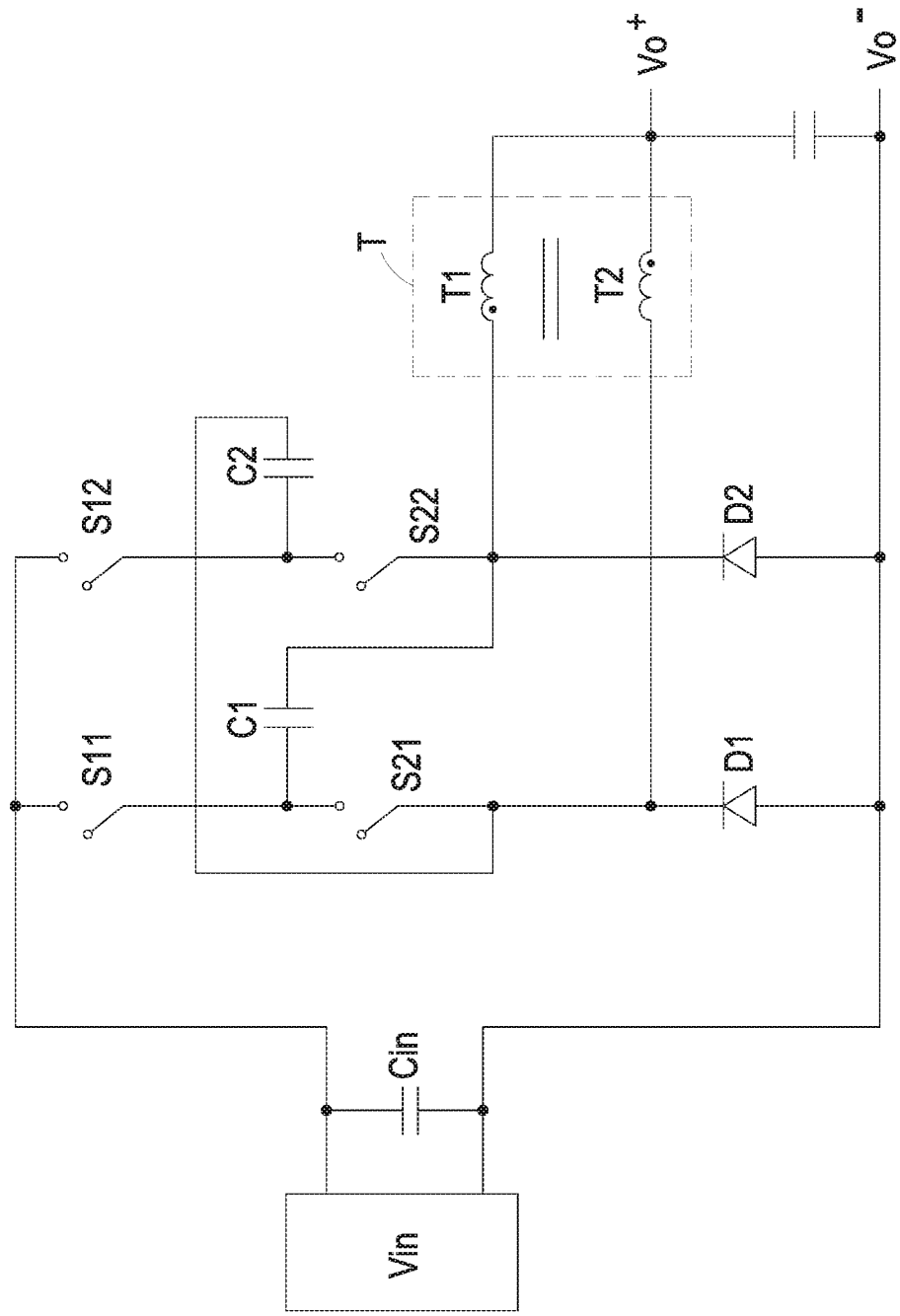
FIG. 7 and FIG. 8 are schematic circuit diagrams illustrating different variants of the power conversion circuit of FIG. 3.

In an embodiment, as shown in FIG. 7, the third switches S31 and S32 can be replaced by the diodes D1 and D2 respectively, and the diodes D1 and D2 work as freewheeling diodes. The switching period is smaller than or equal to the resonant period. The equivalent circuit and current waveforms of this embodiment can be derived from that of the above-mentioned embodiments, thus are omitted herein.

Figure 8:
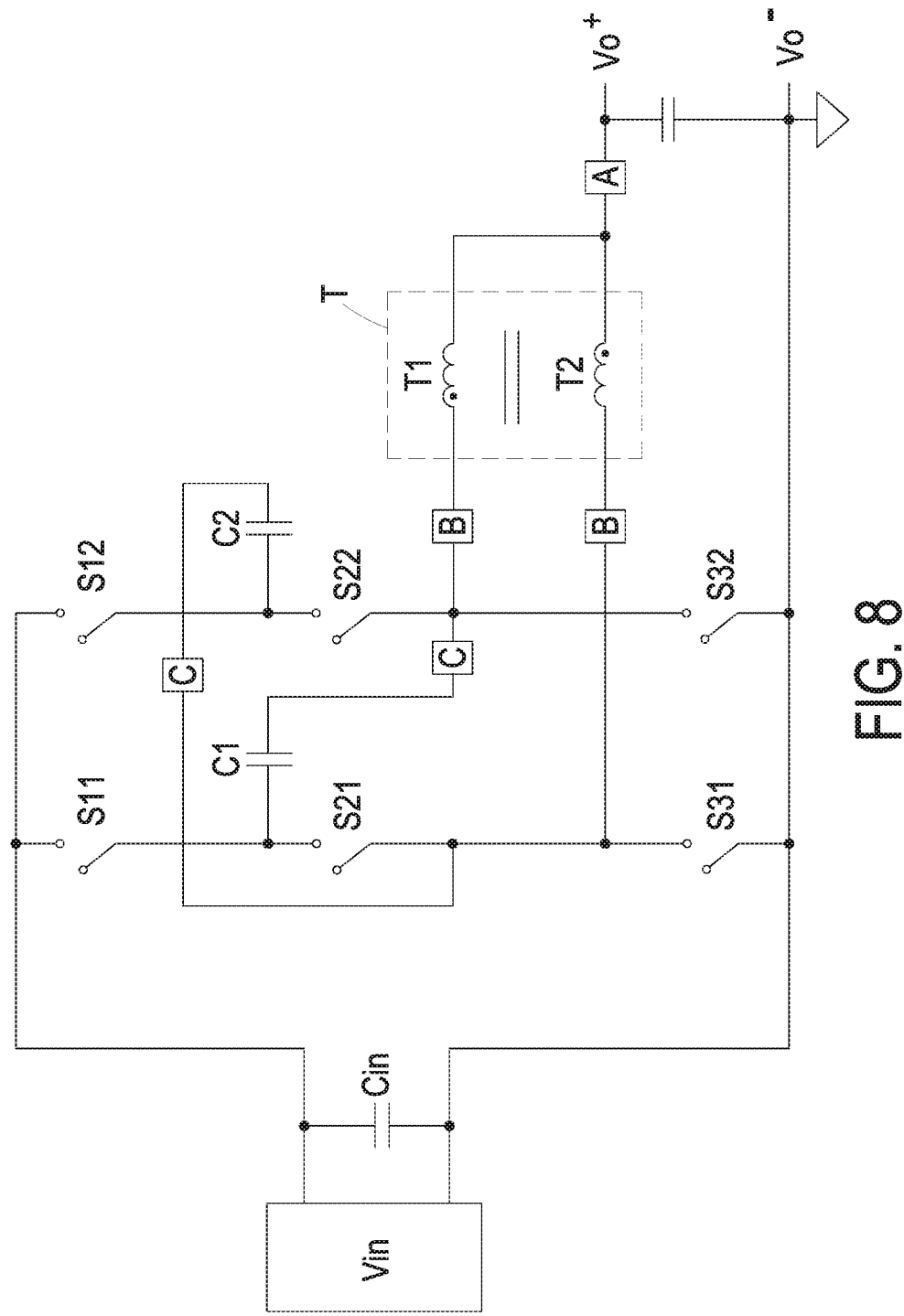

In above embodiments, the resonant inductor includes the leakage inductance generated from the coupling between the two windings T1 and T2 of the transformer T and the parasitic inductance of wires. Taking the switching period and the capacitance value of the resonant capacitors C1 and C2 into consideration, the coupling coefficient of the windings T1 and T2 is preferably but not limited to be larger than 0.9. In addition, in an embodiment, the resonant inductor includes an additional inductor. As shown in FIG. 8, the additional inductor may be disposed at the positions A, B and C. In particular, one additional inductor is disposed at the position A, or two additional inductors with the same inductance value are disposed at two positions B respectively, or two additional inductors with the same inductance value are disposed at two positions C respectively. Moreover, a plurality of additional inductors is disposed in at least two positions of the positions A, B and C.

Figure 9:
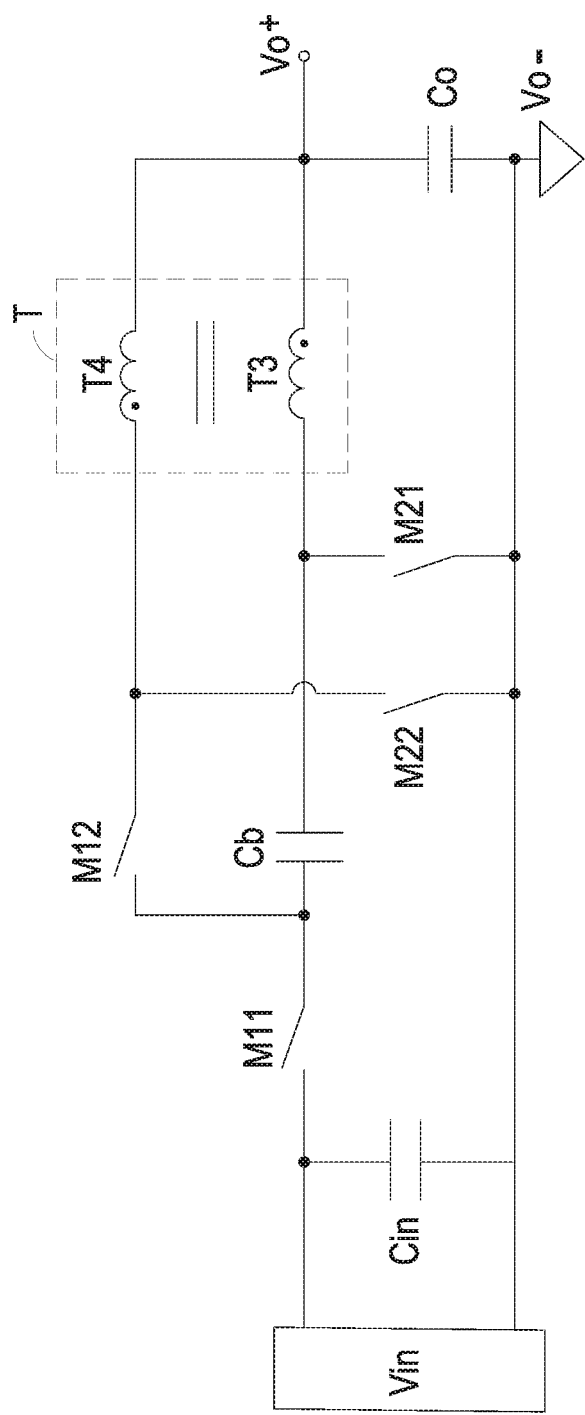
FIG. 9 is a schematic circuit diagram illustrating a power conversion circuit according to a second embodiment of the present disclosure.

FIG. 9 is a schematic circuit diagram illustrating a power conversion circuit according to a second embodiment of the present disclosure. As shown in FIG. 9, in the second embodiment of the present disclosure, the power conversion system includes one power conversion circuit 1b, and the power conversion circuit 1b has an asymmetric circuit configuration. The power conversion circuit 1b includes an input, an output, two cascaded switching power conversion units and a resonant capacitor Cb. The input is configured to receive an input voltage Vin, the output is configured to output an output voltage Vo, and the ratio of the input voltage Vin to the output voltage Vo is 4:1. The two cascaded switching power conversion units are coupled between the input and the output. In this embodiment, one of the two switching power conversion units includes a first switch M11, a second switch M21 and a winding T3. The first switch M11 and the second switch M21 are coupled to each other in series. The first switch M11 and the second switch M21 operate periodically according to a switching period and have a switching frequency. One terminal of the winding T3 is electrically connected between the resonant capacitor Cb and the second switch M21, and the other terminal of the winding T3 is electrically connected to a positive electrode of the output. The other switching power conversion unit includes a first switch M12, a second switch M22 and a winding T4. The first switch M12 and the second switch M22 are coupled to each other in series. The first switch M12 and the second switch M22 operate periodically according to a switching period and have a switching frequency. One terminal of the winding T4 is electrically connected between the first switch M12 and the second switch M22, and the other terminal of the winding T4 is electrically connected to the positive electrode of the output. One terminal of the resonant capacitor Cb is electrically connected between the first switches M11 and M12, and the other terminal of the resonant capacitor Cb is electrically connected between the second switch M21 and the winding T3.

The first switch M11 and the second switch M22 are controlled on and off by the same control signal. The first switch M12 and the second switch M21 are controlled on and off by the same control signal. These two control signals are 180 degrees out of phase with respect to each other.

The turns of the windings T3 and T4 are the same. The dotted terminals of the winding T3 and the undotted terminals of winding T4 are connected together so as to form the positive electrode of the output of the power conversion circuit 1b. The windings T3 and T4 are wound around the same magnetic core pillar to form a close-coupling transformer T. There is an air gap on the magnetic core of the transformer T. The resonance is generated between the resonant capacitor Cb and the resonant inductor through controlling the plurality of switches on and off. Accordingly, the switches can be turned on and off at zero current and can be turned on at zero voltage. The resonant inductor is for example but not limited to a leakage inductance of the transformer T or a parasitic inductance of wires. Further, for turning the switches on at zero voltage, the inductance value of the windings T1 and T2 may be controlled to make the magnetizing inductance small enough and make the magnetizing current large enough.

Figure 10:
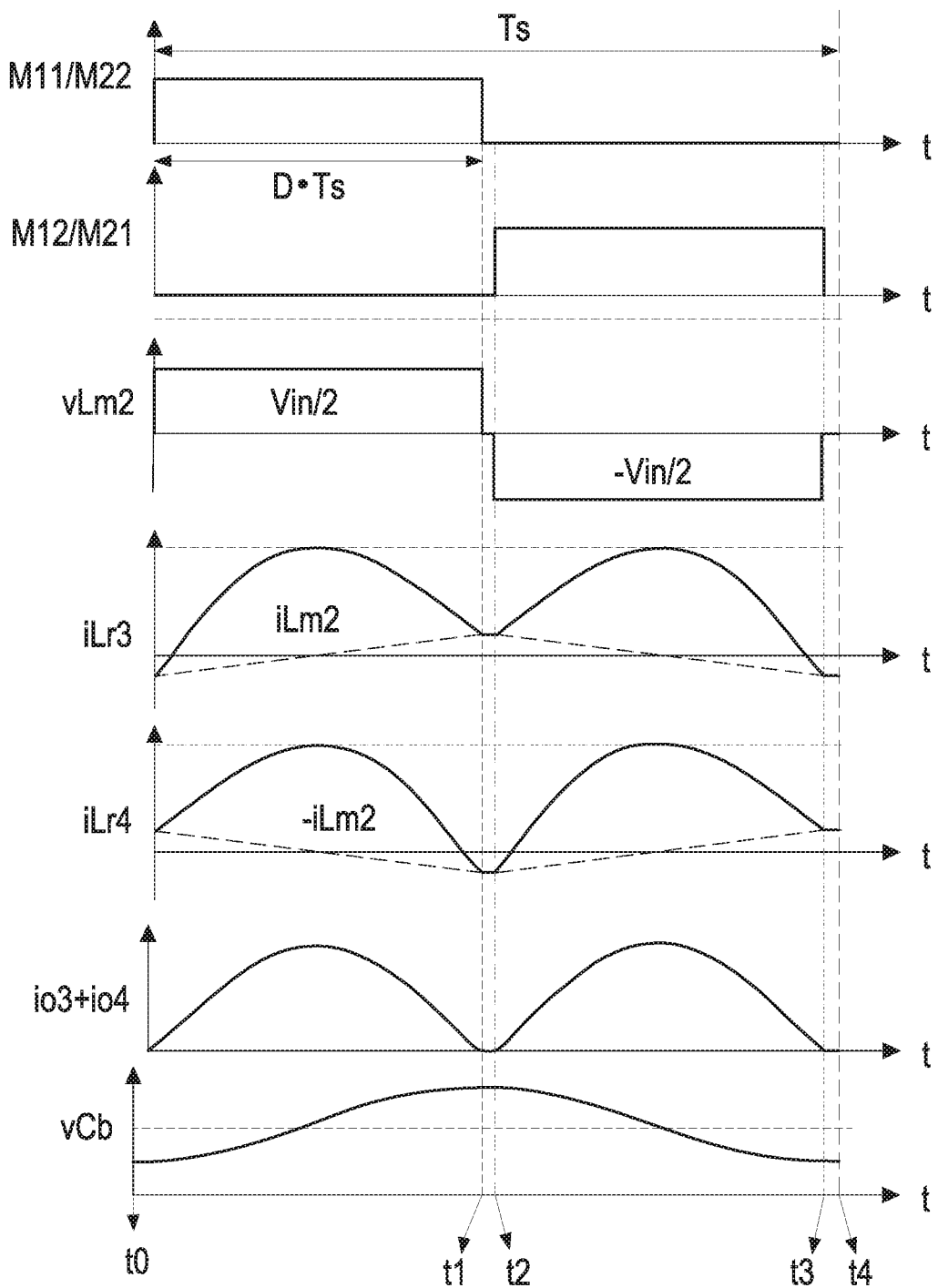
FIG. 10 is a schematic oscillogram showing the waveforms of currents in FIG. 9 corresponding to the variation of the switch state.
Figure 11A:
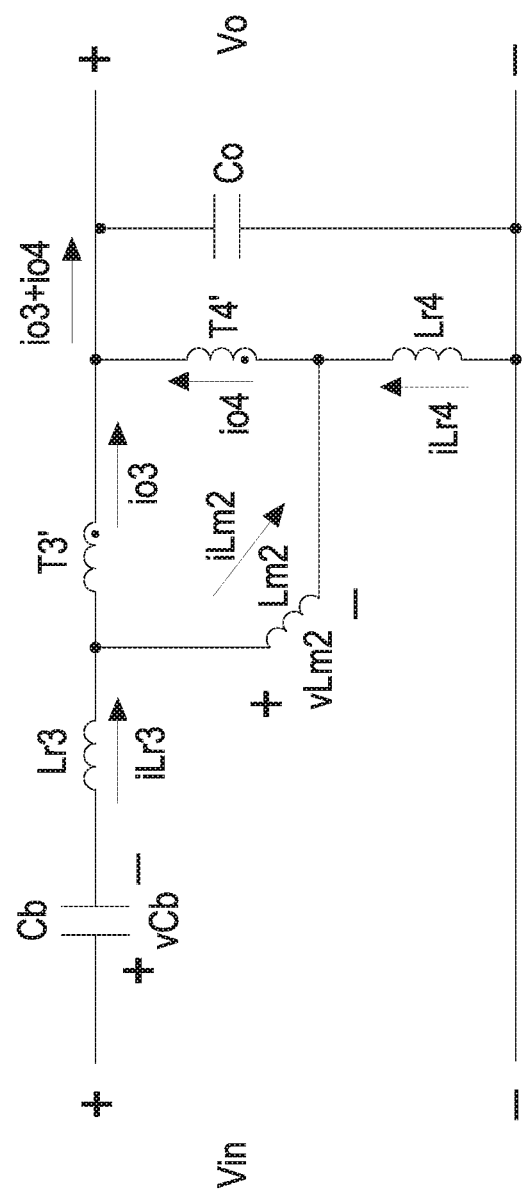
FIG. 11A and FIG. 11B are schematic simplified circuit diagrams of the power conversion circuit of FIG. 9 during different periods of time in the switching period.
Figure 11B:
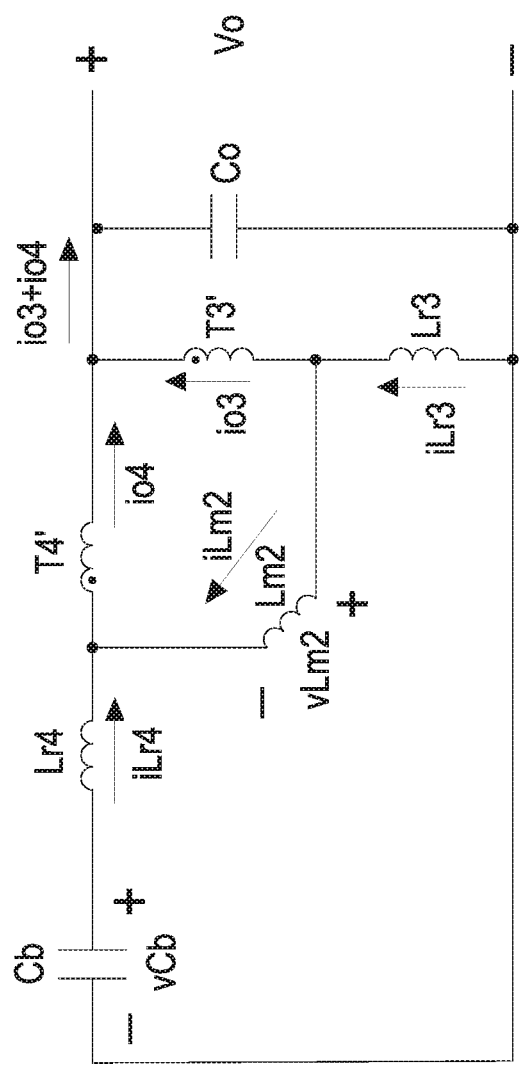

FIG. 10 is a schematic oscillogram showing the waveforms of currents in FIG. 9 corresponding to the variation of the switch state. FIG. 11A and FIG. 11B are schematic simplified circuit diagrams of the power conversion circuit of FIG. 9 during different periods of time in the switching period. In particular, FIG. 11A is a schematic equivalent circuit diagram of the power conversion circuit while the switches M11 and M22 being on, and FIG. 11B is a schematic equivalent circuit diagram of the power conversion circuit while the switches M12 and M21 being on. The equivalent circuit of the transformer T is similar to that shown in FIG. 5A and FIG. 5B, thus is omitted herein. As shown in FIGS. 10, 11A and 11B, D represents the duty ratio, Ts represents the switching period, iLr3 represents the resonant current flowing through the resonant inductor Lr3, and iLr4 represents the resonant current flowing through the resonant inductor Lr4. The resonant current iLr3 includes a load current io3 and a magnetizing current iLm2. The resonant current iLr4 includes a load current io4 and the magnetizing current iLm2. The magnetizing current iLm2 is determined by the magnetizing inductance Lm2 and the voltage applied on the two ends of the windings T3 and T4. The resonant current iLr3 is generated from the resonance between the resonant capacitor Cb and the resonant inductor Lr3, and the resonant current iLr4 is generated from the resonance between the resonant capacitor Cb and the resonant inductor Lr4.

$$Lr3=Lk3+Leq3 \quad (5),$$

$$Lr4=Lk4+Leq4 \quad (6),$$

where Lk3 and Lk4 are the leakage inductance of the transformer T, and Leq3 and Leq4 are the parasitic inductance of wires or/and the additional serial inductor. Since the dotted terminals of the winding T3 and the undotted terminals of winding T4 that have the same turn are electrically connected together, the load currents flowing through the ideal winding T3' and T4' are equal, i.e., io3=io4.

During a period from the time t0 to the time t1, the first switch M11 and the second switch M22 are in "on" state and the first switch M12 and the second switch M21 are in "off" state. The equivalent circuit of the power conversion circuit 1b in this period is shown in FIG. 11A. The resonant capacitor Cb is charged by the input voltage Vin. The voltage vLm2 on the two ends of the equivalent magnetizing inductance Lm2 is equal to Vin/2. The magnetizing current iLm2 is determined by the voltage vLm2 and the equivalent magnetizing inductance Lm2. A resonance is generated among the resonant inductors Lr3 and Lr4 and the resonant capacitor Cb, and the resonant currents iLr3 and iLr4 are generated accordingly. When the resonant currents iLr3 and iLr4 equal the magnetizing currents iLm2 and −iLm2 respectively, i.e., when the load currents io3 and io4 both equal zero, the first switch M11 and the second switch M22 are turned off for realizing the zero current switching (ZCS) of switches. Consequently, the turning-off loss of switches is reduced, and the energy conversion efficiency of the power conversion circuit 1b is improved. In addition, in this period, the terminal voltage of the first switch M12 equals Vin/2, and the terminal voltage of the second switch M21 equals Vin/2. The voltage on the two ends of the resonant capacitor Cb equals a DC voltage superposed by an AC resonant voltage, and the typical value of the DC voltage equals Vin/2. Taking the parameter distribution of components into consideration, the ratio value of the DC voltage to the input voltage is between 0.4 and 0.6. The amplitude of the AC resonant voltage is determined by the resonant inductance value, the resonant capacitance value, the switching frequency and the magnitude of load.

During a period from the time t1 to the time t2, all the switches are turned off. The magnetizing current iLm2 flowing through the windings T3 and T4 flows continuously for extracting the charges on the parasitic capacitors of the first switch M12 and the second switch M21, thereby reducing the terminal voltages of the first switch M12 and the second switch M21. In an embodiment, when the terminal voltage of the first switch M12 and the second switch M21 are reduced to be smaller than 50% of the corresponding initial voltages (i.e., the terminal voltages of the switches at the time t1) respectively, the first switch M12 and the second switch M21 are turned on. Consequently, the turning-on loss of switches is reduced, and the energy conversion efficiency and power density of the power conversion circuit 1b are improved. In another embodiment, the inductance values of the windings T3 and T4 may be controlled to make the equivalent magnetizing inductance Lm2 of the windings T3 and T4 small enough and make the magnetizing current iLm2 flowing through the magnetizing inductance Lm2 large enough. Accordingly, the charges on the parasitic capacitors of the first switch M12 and the second switch M21 can be extracted exhaustively, and the terminal voltages of the first switch M12 and the second switch M21 are decreased to zero. Therefore, when the body diodes of the first switch M12 and the second switch M21 are on, the first switch M12 and the second switch M21 are turned on, thus the zero voltage switching (ZVS) of switches are realized. The turning-on loss of switches can be further reduced, and the energy conversion efficiency and power density of the power conversion circuit 1b are improved.

During a period from the time t2 to the time t3, the first switch M12 and the second switch M21 are in "on" state, and the first switch M11 and the second switch M22 are in "off" state. The equivalent circuit of the power conversion circuit 1b in this period is shown in FIG. 11B. The resonant capacitor Cb is discharged to the output. The voltage vLm2 on the two ends of the equivalent magnetizing inductance Lm2 is equal to −Vin/2. The magnetizing current iLm2 is determined by the voltage vLm2 and the equivalent magnetizing inductance Lm2. The resonant capacitor Cb is discharged to the output through the winding T4 of the transformer T. Similar to that during the period from the time t0 to the time t1, a resonance is generated among the resonant inductors Lr3 and Lr4 and the resonant capacitor Cb, and the resonant currents iLr3 and iLr4 are generated accordingly. When the resonant currents iLr3 and iLr4 equal the magnetizing currents −iLm2 and iLm2 respectively, i.e., when the load currents io3 and io4 both equal zero, the first switch M12 and the second switch M21 are turned off for realizing the zero current switching (ZCS) of switches. Consequently, the turning-off loss of switches is reduced, and the energy conversion efficiency of the power conversion circuit 1b is improved. In addition, in this period, the terminal voltage of the first switch M11 equals Vin/2, the terminal voltage of the second switch M22 equals Vin/2. The voltage on the two ends of the resonant capacitor Cb equals a DC voltage superposed by an AC resonant voltage, and the typical value of the DC voltage equals Vin/2. Taking the parameter distribution of components into consideration, the ratio value of the DC voltage to the input voltage is between 0.4 and 0.6. The amplitude of the AC resonant voltage is determined by the resonant inductance value, the resonant capacitance value, the switching frequency and the magnitude of load.

During a period from the time t3 to the time t4, all the switches are turned off. The magnetizing current iLm2 flowing through the windings T3 and T4 flows continuously for extracting the charges on the parasitic capacitors of the first switch M11 and the second switch M22, thereby reducing the terminal voltages of the first switch M11 and the second switch M22. In an embodiment, when the terminal voltages of the first switch M11 and the second switch M22 are reduced to be smaller than 50% of the initial voltages (i.e., the terminal voltages of the switch at the time t3) respectively, the first switch M11 and the second switch M22 are turned on, and the next switching period begins. Consequently, the turning-on loss of switches is reduced, and the energy conversion efficiency and power density of the power conversion circuit 1b are improved. In another embodiment, the inductance values of the windings T3 and T4 may be controlled to make the equivalent magnetizing inductance Lm2 of the windings T3 and T4 small enough and make the magnetizing current iLm2 flowing through the magnetizing inductance Lm2 large enough.

Accordingly, the charges on the parasitic capacitors of the first switch M11 and the second switch M22 can be extracted exhaustively, and the terminal voltages of the first switch M11 and the second switch M22 are decreased to zero. Therefore, when the body diodes of the first switch M11 and the second switch M22 are on, the first switch M11 and the second switch M22 are turned on, thus the zero voltage switching (ZVS) of switches are realized. The turning-on loss of the switches can be further reduced, and the energy conversion efficiency and power density of the power conversion circuit 1b are improved.

During the period from the time t0 to the time t1 and the period from the time t2 to the time t3, the resonant currents iLr3 and iLr4 flows through the windings T3 and T4 simultaneously, and the frequency of the resonant currents iLr3 and iLr4 is equal to the resonant frequency. During the period from the time t1 to the time t2 and the period from the time t3 to the time t4, all the switches are turned off. The magnetizing current iLm2 flowing through the windings T3 and T4 charges and discharges the parasitic capacitors of the switches, and the frequency of the magnetizing current iLm2 is equal to the switching frequency. In this embodiment, the resonant period is substantially equal to the switching period.

In another embodiment, the switching period is smaller than the resonant period. The capacitance value of the resonant capacitor Cb is large, and the inductance value of the resonant inductor Lr is small. Therefore, when the resonant current is larger than the corresponding magnetizing current, the corresponding switches are turned off, and the turning-off loss can be ignored.

Figure 12:
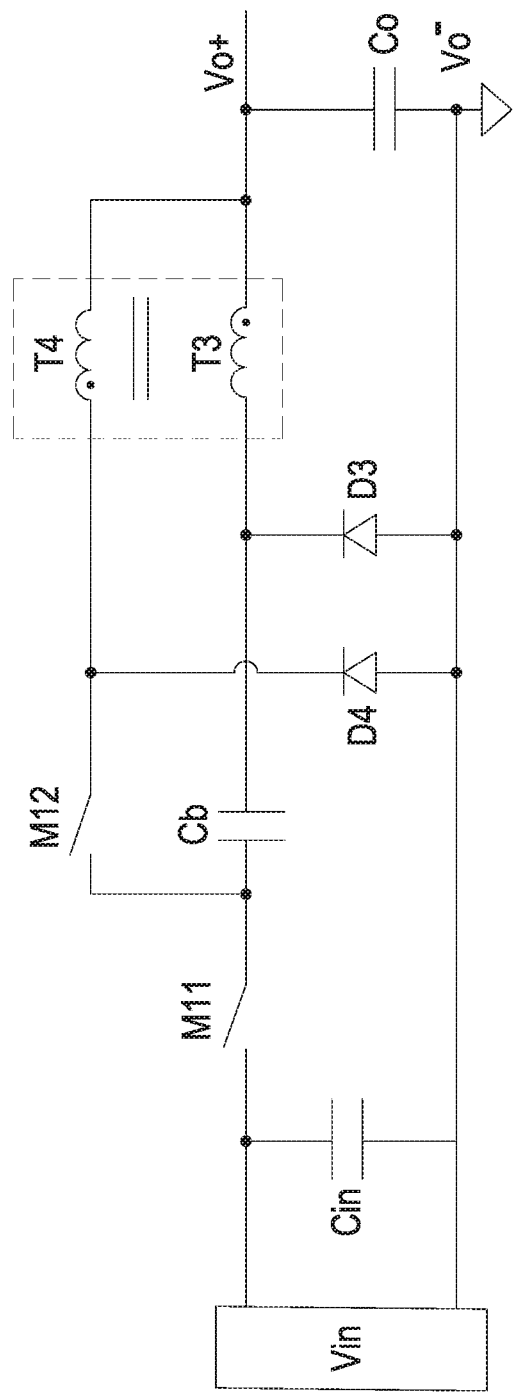
FIG. 12 and FIG. 13 are schematic circuit diagrams illustrating different variants of the power conversion circuit of FIG. 9.

In an embodiment, as shown in FIG. 12, the second switches M21 and M22 can be replaced by the diodes D3 and D4, and the diodes D3 and D4 work as free-wheeling diodes. The switching period is smaller than or equal to the resonant period. The equivalent circuit and current waveforms of this embodiment can be derived from that of the above-mentioned embodiments, thus are omitted herein.

Figure 13:
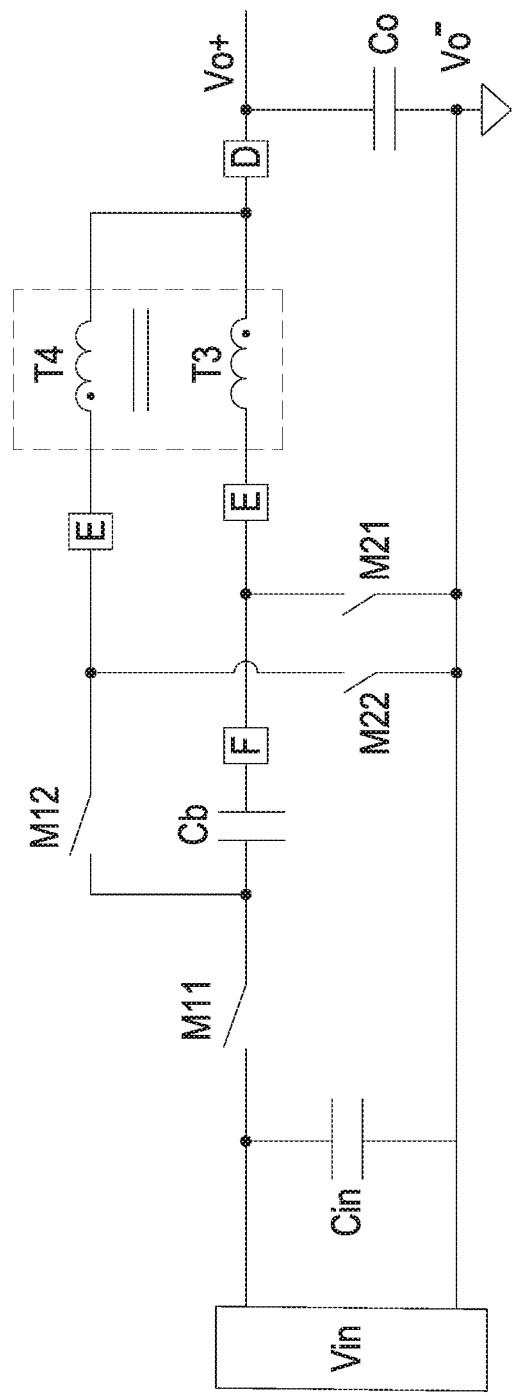

In above embodiments, the resonant inductor includes the leakage inductance generated from the coupling between the two windings T3 and T4 of the transformer T and the parasitic inductance of wires. Taking the switching period and the capacitance value of the resonant capacitor Cb into consideration, the coupling coefficient of the windings T3 and T4 is preferably but not limited to be larger than 0.9. In addition, in an embodiment, the resonant inductor includes an additional inductor. As shown in FIG. 13, the additional inductor may be disposed at the positions D, E and F. In particular, one additional inductor is disposed at the position D, or two additional inductors with the same inductance value are disposed at two positions E respectively, or two additional inductors with the same inductance value are disposed at two positions F respectively. Moreover, a plurality of additional inductors is disposed in at least two positions of the positions D, E and F.

Figure 14:
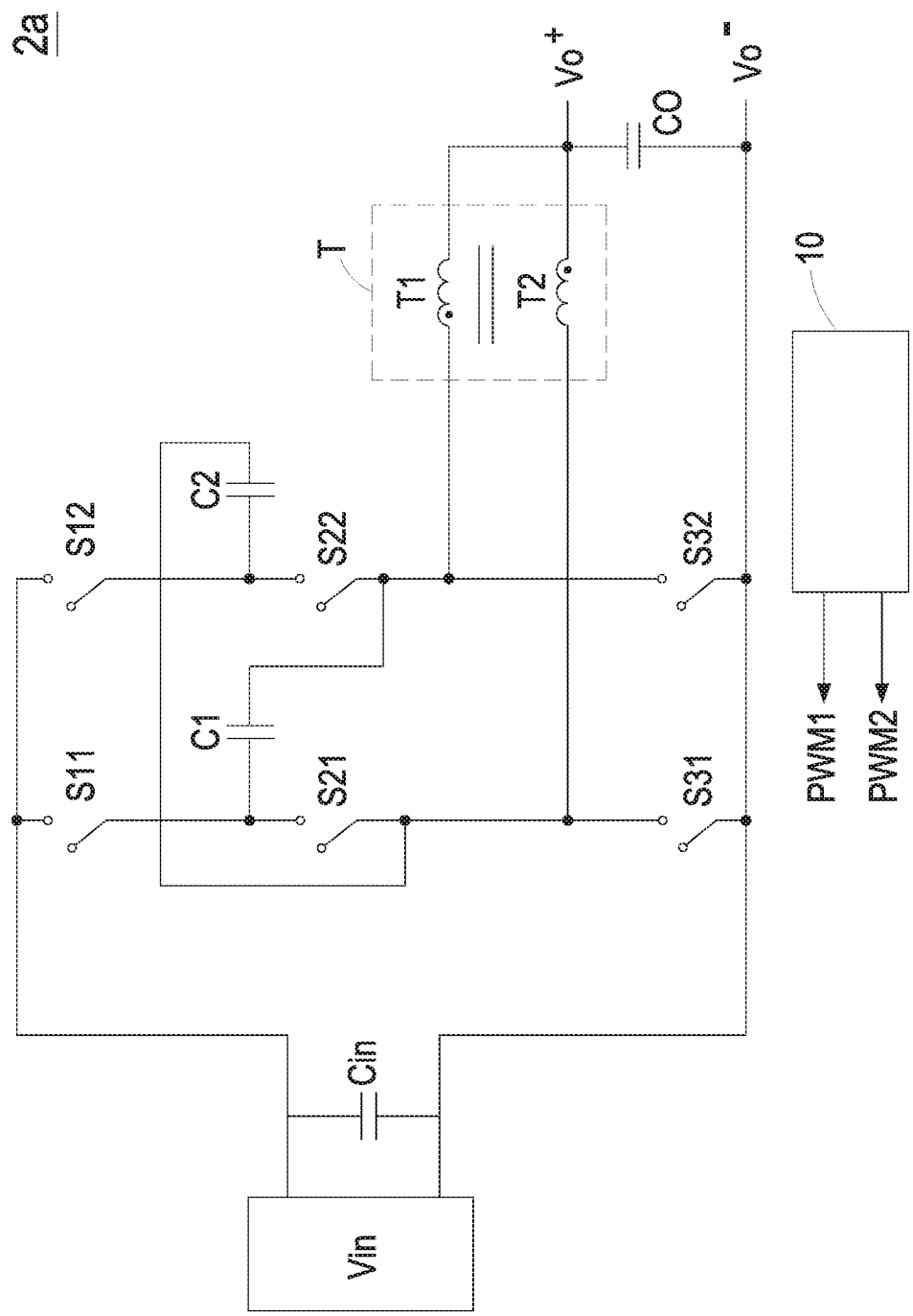
FIG. 14 is a schematic circuit diagram illustrating a power conversion system according to the first embodiment of the present disclosure.

FIG. 14 is a schematic circuit diagram illustrating a power conversion system according to the first embodiment of the present disclosure. As shown in FIG. 14, the power conversion system 2a includes at least a symmetric power conversion circuit 1a and a controller 10. The controller 10 outputs two control signals PWM1 and PWM2. The two control signals PWM1 and PWM2 are 180 degrees out of phase with respect to each other. The control signal PWM1 is configured to control on and off of the first switch S11, the second switch S22 and the third switch S31. The control signal PWM2 is configured to control on and off of the first switch S12, the second switch S21 and the third switch S32.

Figure 15:
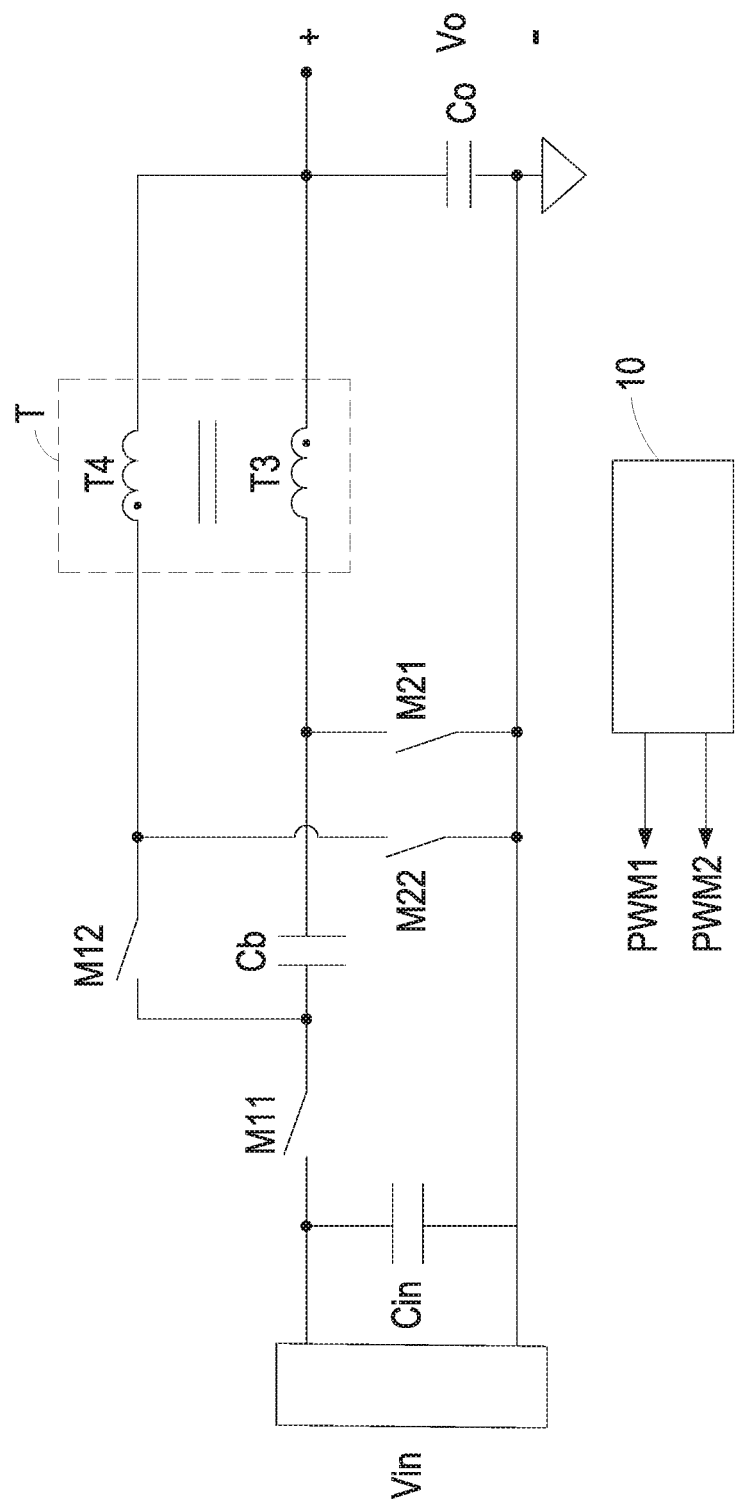
FIG. 15 is a schematic circuit diagram illustrating a power conversion system according to the second embodiment of the present disclosure.

FIG. 15 is a schematic circuit diagram illustrating a power conversion system according to the second embodiment of the present disclosure. As shown in FIG. 15, the power conversion system 2b includes at least an asymmetric power conversion circuit 1b and a controller 10. The controller 10 outputs two control signals PWM1 and PWM2. The two control signals PWM1 and PWM2 are 180 degrees out of phase with respect to each other. The control signal PWM1 is configured to control on and off of the first switch M11 and the second switch M22. The control signal PWM2 is configured to control on and off of the first switch M12 and the second switch M21.

Figure 16:
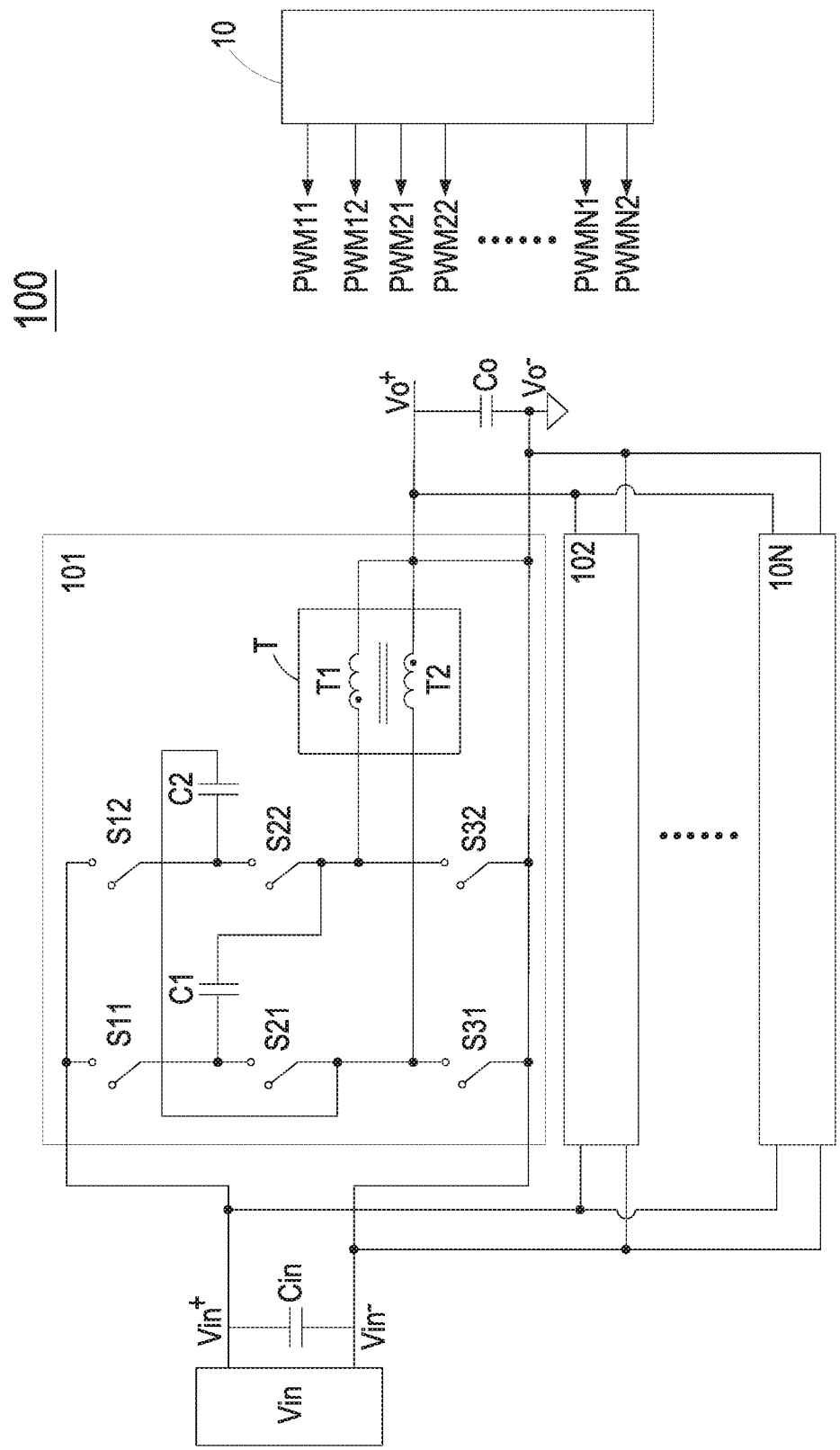
FIG. 16 is a schematic circuit diagram illustrating the power conversion system including a plurality of power conversion circuits connected in parallel and interleaved with each other according to the first embodiment of the present disclosure.
Figure 17:
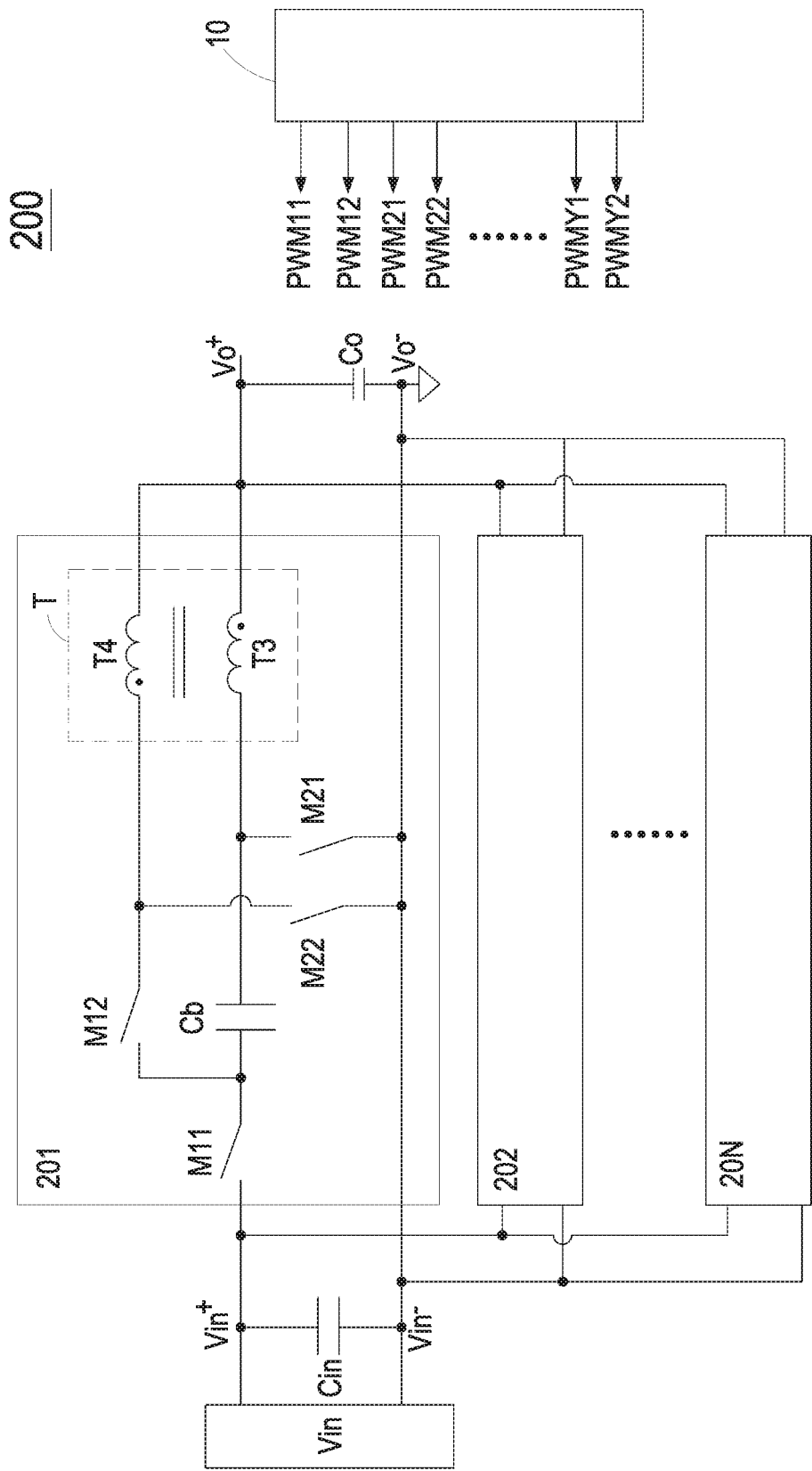
FIG. 17 is a schematic circuit diagram illustrating the power conversion system including a plurality of power conversion circuits connected in parallel and interleaved with each other according to the second embodiment of the present disclosure.

In order to satisfy the requirement of high-power applications, in an embodiment, the present disclosure utilizes a plurality of power conversion circuits connected in parallel and interleaved with each other to enlarge the load capacity of the power conversion system. As shown in FIG. 16 and FIG. 17, the power conversion systems 100 and 200 includes N symmetric power conversion circuits and N asymmetric power conversion circuits respectively, where N is an integer larger than 1. (In the embodiments shown in FIG. 1 to FIG. 15, N equals 1, namely the power conversion system includes only one power conversion circuit). All the power conversion circuits have the same circuit configuration and substantially identical circuit parameters. The specific circuit configurations of the power conversion circuits are similar to that of the power conversion circuits 1a and 1b shown in above embodiments, and the detailed description thereof is omitted herein. The inputs of the N power conversion circuits are all connected in parallel, and the outputs of the N power conversion circuits are all connected in parallel. The inputs share at least one input capacitor CM after being connected in parallel, or the inputs are connected to N input capacitors CM respectively before being connected in parallel. Similarly, the outputs share at least one output capacitor Co after being connected in parallel, or the outputs are connected to N output capacitors Co respectively before being connected in parallel.

In addition, the power conversion system 100 and 200 further includes a controller 10. As shown in the symmetric power conversion circuit of FIG. 16, the controller 10 outputs N sets of control signals (PWM11, PWM12), (PWM21, PWM22) . . . (PWMN1, PWMN2). The control signals PWM11, PWM21 . . . PWMN1 are 360/2N degree out of phase with respect to each other in sequence. The control signals PWM11 and PWM 12 are utilized to control the power conversion circuit 101, the control signals PWM21 and PWM22 are utilized to control the power conversion circuit 102, and so forth, and the control signals PWMN1 and PWMN2 are utilized to control the power conversion circuit 10N. In another embodiment, the angle of the N sets of control signals PWM11, PWM21 . . . PWMN1 being out of phase with respect to each other in sequence may be any angle between (360/2N−20) and (360/2N+20) degrees.

As shown in the asymmetric power conversion circuit of FIG. 17, when N is odd, the controller 10 outputs Y sets of control signals (PWM11, PWM12), (PWM21, PWM22) . . . (PWMY1, PWMY2). Y equals N, and the control signals PWM11, PWM21 . . . PWMY1 are 360/N degrees out of phase with respect to each other in sequence. In another embodiment, the angle of the Y sets of control signals PWM11, PWM21 . . . PWMY1 being out of phase with respect to each other in sequence may be any angle between (360/N−20) and (360/N+20) degrees. The control signals PWM11 and PWM 12 are utilized to control the power conversion circuit 201, the control signals PWM21 and PWM22 are utilized to control the power conversion circuit 202, and so forth, and the control signals PWMY1 and PWMY2 are utilized to control the power conversion circuit 20N. When N is even, the controller 10 output Y sets of control signals (PWM11, PWM12), (PWM21, PWM22) . . . (PWMY1, PWMY2). Y equals N/2, and the control signals PWM11, PWM21 . . . PWMY1 are 360/N degrees out of phase with respect to each other in sequence. In another embodiment, the angle of the N sets of control signals PWM11, PWM21 . . . PWMY1 being out of phase with respect to each other in sequence may be any angle between (360/N−20) and (360/N+20) degrees. The control signals PWM11 and PWM 12 are utilized to control the power conversion circuits 201 and 20(Y+1), the control signals PWM21 and PWM22 are utilized to control the power conversion circuits 202 and 20(Y+2), and so forth, and the control signals PWMY1 and PWMY2 are utilized to control the power conversion circuits 20Y and 20N.

The interleaved and parallel circuit configuration not only enlarge the load capacity of the power conversion system but also reduce the current ripples of the input and output of the power conversion system through controlling the controls signals to be output of phase with respect to each other. Therefore, the size of the input and output filters is decreased, the size of the power conversion system is decreased, and the power density of the power conversion system is improved.

In addition, the switches mentioned in the above embodiments may be MOS, SiC or GaN, and the resonance and the interleaved and parallel connection would not be affected.

From the above descriptions, the present disclosure provides a power conversion system. By replacing the inductors with the transformer and connecting the windings in special ways, a resonance is generated among the resonant capacitors and inductors through controlling switches on and off. Accordingly, the switches are turned off at zero current and are turned on at zero voltage. Consequently, the switching loss is greatly reduced, and the energy conversion efficiency is improved. The resonant inductor may be a leakage inductance of the transformer, a parasitic inductance of wires or an additional inductor. In addition, with regard to high-power applications, a plurality of power conversion circuits are connected in parallel and are interleaved with each other so as to enlarge the load capacity of the power conversion system. Through the phase shifts among the control signals, the plurality of power conversion circuits are allowed to be connected in parallel and to be interleaved with each other. Meanwhile, the current ripples at the input and output sides of the power conversion system are reduced. Consequently, the filtering components with small size can be employed, and the size of the power conversion system is decreased.

While the disclosure has been described in terms of what is presently considered to be the most practical and preferred embodiments, it is to be understood that the disclosure needs not be limited to the disclosed embodiment.

What is claimed is:

1. A power conversion system, comprising:
   N power conversion circuits, wherein N is an integer larger than or equal to 1, and each of the N power conversion circuits comprises:
      an input configured to receive an input voltage;
      an output configured to output an output voltage;
      two cascaded switching power conversion units coupled between the input and the output, wherein each of the two switching power conversion units comprises a plurality of switches and a winding, a part of the plurality of switches is connected in series with each other and is coupled among the inputs of the N power conversion circuits, the plurality of switches operates periodically according to a switching period, the two windings of the two switching power conversion units have the same turn, a positive terminal of one winding is electrically coupled to a negative terminal of the other winding, the positive and negative terminals of the two windings are coupled to the output, and the two windings are magnetically coupled to each other to form a transformer; and
   at least one resonant capacitor serially coupled between the input and the output, wherein the resonant capacitor has a DC voltage proportional to the input voltage, in one switching period, the resonant capacitor stores an energy or outputs the stored energy to the output as the corresponding switch of the switching power conversion unit is turned on or off, a resonance is generated between the resonant capacitor and a resonant inductor, and the generated resonance has a resonant frequency and a resonant period,
   wherein at least a part of an inductance of the resonant inductor is a leakage inductance of the transformer.

2. The power conversion system according to claim 1, wherein the switching period is smaller than or equal to the resonant period.

3. The power conversion system according to claim 1, wherein the switching period is larger than or equal to a half of the resonant period.

4. The power conversion system according to claim 1, wherein a part of the inductance of the resonant inductor is a parasitic inductance of wires.

5. The power conversion system according to claim 4, wherein the resonant inductor comprises at least one additional inductor, the at least one additional inductor is connected between the output and an electrical connection position of the positive and negative terminals of the two windings, or the at least one additional inductor is connected to the at least one winding in series, or the at least one additional inductor is connected to the at least one resonant capacitor in series.

6. The power conversion system according to claim 1, wherein in each of the N power conversion circuits, a coupling coefficient of the two windings is larger than 0.9.

7. The power conversion system according to claim 1, wherein each of the N power conversion circuits comprises two resonant capacitors, in each of the N power conversion circuits, each of the two switching power conversion units comprises the winding, a first switch, a second switch and a third switch, one terminal of the winding is electrically connected between the second switch and the third switch, the other terminal of the winding is electrically connected to the output, one terminal of the resonant capacitor is electrically connected between the first switch of one switching power conversion unit and the second switch of the other switching power conversion unit, the other terminal of the resonant capacitor is electrically connected between the second switch and the third switch of the one switching power conversion unit.

8. The power conversion system according to claim 7, wherein the first and second switches of one switching power conversion unit and the third switch of the other switching power conversion unit are turned on and off simultaneously, and a time of the first and second switches of each switching power conversion unit being on is shorter than a half of the switching period, and the two first switches of the two switching power conversion units are turned on with 180 degrees out of phase with respect to each other.

9. The power conversion system according to claim 7, wherein in each of the N power conversion circuits, when a resonant current flowing through one of the two windings is larger than or equal to a corresponding magnetizing current, the first and second switches of the corresponding switching power conversion unit and the third switch of the other switching power conversion unit are turned off.

10. The power conversion system according to claim 7, further comprising a controller, wherein the controller outputs at least one set of control signals to control the N power conversion circuits, where N is larger than 1, the controller outputs N sets of control signals to control the N power conversion circuits respectively, wherein in the N sets of control signals, an angle of the corresponding control signals being output of phase with respect to each other is any angle between (360/2N−20) and (360/2N+20) degrees.

11. The power conversion system according to claim 7, wherein in each of the N power conversion circuits, each switching period has two first time periods and two second time periods, the first and second time periods are interlaced with each other, the first time period is smaller than or equal to a half of the resonant period, wherein in the first time period, a power is transferred from the input to the output, the current flowing through the two windings is a resonant current, wherein in the second time period, all the switches are turned off.

12. The power conversion system according to claim 11, wherein the second time period has a beginning instant and an end instant, and a terminal voltage of at least one of the plurality of switches is controlled to be any value between 0 and Vd*50% at the end instant by controlling a magnetizing inductance of the two windings and a magnetizing current flowing through the magnetizing inductance, where Vd is a terminal voltage of this switch at the beginning instant.

13. The power conversion system according to claim 1, wherein in each of the N power conversion circuits, each of the two switching power conversion units comprises the winding and a first switch and a second switch serially coupled in sequence, the two switching power conversion units are a first switching power conversion unit and a second switching power conversion unit respectively, the resonant capacitor is serially coupled between the first and second switches of the first switching power conversion unit, one terminal of the first switch of the second switching power conversion unit is electrically connected between the first switch of the first switching power conversion unit and the resonant capacitor, one terminal of the winding of the first switching power conversion unit is electrically connected between corresponding second switch and the resonant capacitor, one terminal of the winding of the second switching power conversion unit is electrically connected between the corresponding first and second switches, and the other terminals of the two windings are electrically connected to the output.

14. The power conversion system according to claim 13, wherein the first switch of one switching power conversion unit and the second switch of the other switching power conversion unit are turned on and off simultaneously, a time of the first switch being on is shorter than a half of the switching period, and the two first switches of the two switching power conversion units are turned on with 180 degrees out of phase with respect to each other.

15. The power conversion system according to claim 13, wherein in each of the N power conversion circuits, when a resonant current flowing through one of the two windings is larger than or equal to a corresponding magnetizing current, the first switch of the corresponding switching power conversion unit and the second switch of the other switching power conversion unit are turned off.

16. The power conversion system according to claim 13, wherein in each of the N power conversion circuits, each switching period has two first time periods and two second time periods, the first and second time periods are interlaced with each other, the first time period is smaller than or equal to a half of the resonant period, wherein in the first time period, a power is transferred from the input to the output, the current flowing through the two windings is a resonant current, wherein in the second time period, all the switches are turned off.

17. The power conversion system according to claim 16, wherein the second time period has a beginning instant and an end instant, and a terminal voltage of at least one of the plurality of switches is controlled to be any value between 0 and Vd*50% at the end instant by controlling a magnetizing inductance of the two windings and a magnetizing current flowing through the magnetizing inductance, where Vd is a terminal voltage of this switch at the beginning instant.

18. The power conversion system according to claim 13, further comprising a controller, wherein the controller outputs at least one set of control signals to control the N power conversion circuits, when N is larger than 1 and is odd, the controller outputs N sets of control signals to control the N power conversion circuits respectively, wherein in the N sets of control signals, an angle of the corresponding control signals being output of phase with respect to each other is any angle between (360/N−20) and (360/N+20) degrees.

19. The power conversion system according to claim 18, wherein when N is larger than 1 and is even, the controller outputs N/2 sets of control signals, the (n)th set of control signals is utilized to control the (n)th and (N/2+n)th power conversion circuits, wherein in the N/2 sets of control signals, an angle of the corresponding control signals being output of phase with respect to each other is any angle between (360/N−20) and (360/N+20) degrees, and n is an integer larger than 1 and smaller than N.

20. The power conversion system according to claim 1, wherein the two windings are wound around the same magnetic core pillar.

21. The power conversion system according to claim 1, wherein a ratio of the input voltage to the output voltage is 4:1.

22. The power conversion system according to claim 1, wherein a ratio value of a DC voltage on the resonant capacitor to the input voltage is between 0.4 and 0.6.

\* \* \* \* \*